(12) United States Patent
Takaki et al.

(10) Patent No.: US 7,462,711 B2
(45) Date of Patent: *Dec. 9, 2008

(54) U-OXO CROSSLINKED DISSIMILAR METAL PHTHALOCYANINE COMPOUND AND PROCESS FOR SELECTIVELY PRODUCING THE SAME

(75) Inventors: Kenji Takaki, Yawata (JP); Yasuhiro Yamasaki, Neyagawa (JP)

(73) Assignee: Orient Chemical Industries, Ltd., Osaka (JP)

( * ) Notice: Subject to any disclaimer, the term of this patent is extended or adjusted under 35 U.S.C. 154(b) by 611 days.

This patent is subject to a terminal disclaimer.

(21) Appl. No.: 10/516,884

(22) PCT Filed: Jun. 9, 2003

(86) PCT No.: PCT/JP03/07240

§ 371 (c)(1),
(2), (4) Date: Dec. 3, 2004

(87) PCT Pub. No.: WO03/104334

PCT Pub. Date: Dec. 18, 2003

(65) Prior Publication Data
US 2006/0020129 A1    Jan. 26, 2006

(30) Foreign Application Priority Data
Jun. 10, 2002    (JP)    ............................. 2002-168580

(51) Int. Cl.
C09B 47/04    (2006.01)
C07D 487/22    (2006.01)

(52) U.S. Cl. ....................... 540/139; 540/123; 540/125; 540/128; 540/140; 540/141

(58) Field of Classification Search ................. 540/139, 540/123, 125, 128, 140, 141
See application file for complete search history.

(56) References Cited

U.S. PATENT DOCUMENTS

| | | | |
|---|---|---|---|
| 5,213,929 A | 5/1993 | Takano et al. | |
| 6,093,514 A * | 7/2000 | Yamasaki et al. | ............. 430/78 |
| 7,087,747 B2 * | 8/2006 | Yamasaki et al. | ........... 540/139 |
| 2004/0091742 A1 | 5/2004 | Yamasaki et al. | |
| 2004/0146793 A1 | 7/2004 | Yamasaki et al. | |

FOREIGN PATENT DOCUMENTS

| | | |
|---|---|---|
| EP | 0798346 A2 | 10/1997 |
| EP | 1004634 A2 * | 11/1999 |
| EP | 1004634 A2 | 5/2000 |
| JP | 6-145550 A | 5/1994 |

* cited by examiner

Primary Examiner—James O. Wilson
Assistant Examiner—Paul V. Ward
(74) Attorney, Agent, or Firm—Birch, Stewart, Kolasch & Birch, LLP

(57) ABSTRACT

An object of the present invention is to provide a novel μ-oxo bridged heterometal phthalocyanine compound, and a production method such that the μ-oxo bridged heterometal phthalocyanine compound is obtained simply, selectively and with high yield. The μ-oxo bridged heterometal phthalocyanine compound has a structure in which the central metal atom (M1) in a metal phthalocyanine including M1 as central metal thereof is oxo-bridged with the central metal M2 in a metal phthalocyanine including M2 as central metal thereof.

9 Claims, 13 Drawing Sheets

<br>

U-OXO CROSSLINKED DISSIMILAR METAL PHTHALOCYANINE COMPOUND AND PROCESS FOR SELECTIVELY PRODUCING THE SAME

FIELD OF THE INVENTION

The present invention relates to a novel μ-oxo bridged herometal phthalocyanine compound which is useful for electric charge generating materials such as organic photoreceptors, photoconductive materials, optical recording materials, organic solar cell materials, nonlinear optical materials and the like, and to a production method thereof.

DESCRIPTION OF THE RELATED ART

Metal phthalocyanine-based compounds have been noted as organic photoconductive substances having sensitivity around a wavelength of 800 nm which is an oscillation wavelength range of a semiconductor laser. A number of organic photoreceptors (OPC) including such organic photoconductive substances as effective components have been proposed. For example, organic photoreceptors employing titanylphthalocyanine-based compounds as electric charge generating materials have been made to practical use.

Recently, medium-to-high sensitive electric charge generating materials provided with a new performance, that are suitable for the shortwaving of a light source by the prevalence of light-emitting diodes (LED) and OPC for color laser-beam printers (LBP), have been vigorously searched.

It has been known that phthalocyanine (Pc) compounds generate electric charge by exposing to light and show various electrical properties depending upon polymorphs thereof, presence or absence of central metal, kind of central metal thereof, and the like.

For example, with regard to a mixed crystal of two or more kinds of phthalocyanine compounds, Japanese Patent Kokai Publication No. H2(1990) 272067 discloses a method for preparing an X-type metal-free phthalocyanine composition, wherein titanylphthalocyanine is added to a metal-free phthalocyanine in an amount equal or less than that of the metal-free phthalocyanine and mixed to conduct crystal transformation. Japanese Patent Kokai Publication No. H4(1992) 351673 also discloses a mixed crystal of oxytitanium phthalocyanine and at least one kind of hydroxymetal phthalocyanine. Japanese Patent Kokai Publication No. H4(1992) 184452 discloses a coating solution for photoreceptors, which contains titanylphthalocyanine and a multilayer-type phthalocyanine derivative. Japanese Patent Kokai Publication No. H8(1996) 67829 discloses a method for preparing a phthalocyanine mixed crystal, which comprises: dissolving at least two kinds of phthalocyanine-based compounds in acid; and adding this solution to a mixture solution of water and an organic solvent having a dielectric constant of 20 or less so as to precipitate as the phthalocyanine mixed crystal. Japanese Patent Kokai Publication No. 2002-12790 discloses a mixed crystal of at least three kinds of phthalocyanine each having different central substance.

Further, Japanese Patent Kokai Publication No. H9(1997) 217020 discloses a μ-oxo aluminum phthalocyanine dimer having a new polymorph, and Japanese Patent Kokai Publication No. H10(1998) 88023 discloses a μ-oxo gallium phthalocyanine dimer. In addition, Japanese Patent Kokai Publication No. H7(1995) 295259 discloses an alkoxy bridged metal phthalocyanine dimer.

Japanese Patent Kokai Publication No. H6(1994) 145550 discloses a process, which includes the step of mixing a titanylphthalocyanine with a halogenated metal phthalocyanine having metal (III) as central metal thereof, and reprecipitating the mixture by acid pasting treatment in water. However, the reference does not describe μ-oxo bridged compounds, or selective production method thereof.

With regard to a μ-oxo herometal phthalocyanine dimer, Japanese Patent Kokai Publication No. 2000-219817 discloses a μ-oxo aluminum/gallium phthalocyanine dimer. The phthalocyanine dimer described therein, however, is inevitably obtained in the form of a mixture of three kinds which contains a μ-oxo aluminum phthalocyanine dimer, and a μ-oxo gallium phthalocyanine dimer in addition to μ-oxo aluminum/gallium phthalocyanine dimer.

Further, U.S. Pat. No. 4,900,817 discloses a polycyclic phthalocyanine compound such as (HO)GePc-O—SiPcOSi $(C_6H_{13})_3$. The polycyclic phthalocyanine compound, however, has tetravalent Si and Ge as central metal thereof. In addition, a production method thereof is based on dehydration of hydroxy-substituted metal (IV) phthalocyanine in an organic solvent.

SUMMARY OF THE INVENTION

It is an object of the present invention to provide a novel μ-oxo bridged herometal phthalocyanine compound, which can provide an organic photoreceptor having diversified properties, e.g. optical sensitivity or electric property to use the materials as charge generating materials.

It is another object of the present invention to provide a method for preparing the μ-oxo bridged herometal phthalocyanine compound, which allows a simple production of the compound with excellent selectivity and high yield.

More specifically, the present invention provides a μ-oxo bridged herometal phthalocyanine compound represented by the following formula I:

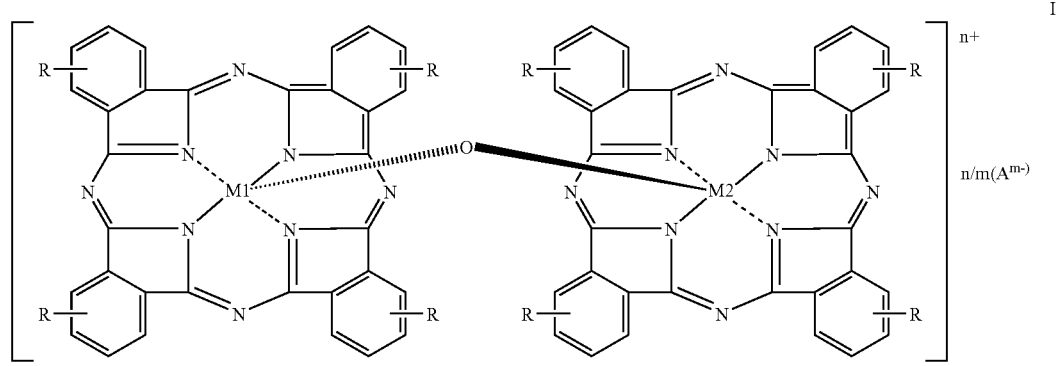

wherein M1 represents a metal atom which is able to have a valence of up to three, excepting indium (In), M2 represents a metal atom which is able to have a valence of four, R represents each independently one or more substituent groups and/or substituent atoms, ($A^{m-}$) represents a counteranion A having a valence of m, n/m represents the number of the counteranion, n represents an integer selected from 0 or 1 to 3 corresponding to a valence of M2, and m represents 1 or 2.

The present invention also provides a method for preparing a μ-oxo bridged heterometal phthalocyanine compound, which comprises the step of reacting phthalocyanine having halometal (III) as central metal thereof with phthalocyanine having oxymetal (IV) as central metal thereof, respectively, in equimolar amount, and washing the resultant compound with aqueous ammonia.

DETAILED DESCRIPTION OF THE INVENTION

Figure 1:
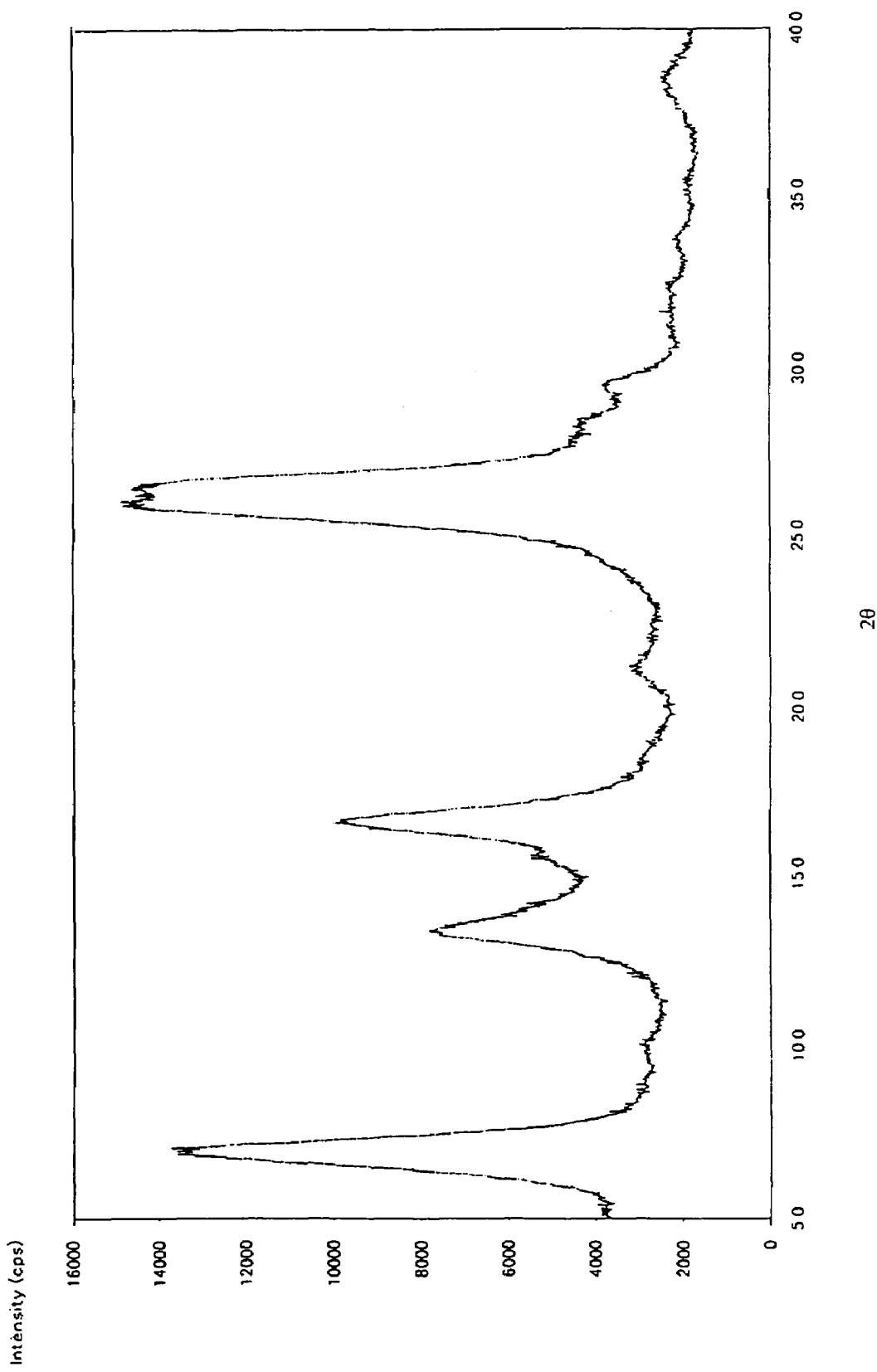
FIG. 1 is a XRD spectrum of Example 1.

A μ-oxo bridged heterometal phthalocyanine compounds of the present invention has a structure in which the central metal atom (M1) in a metal phthalocyanine including M1 as central metal thereof is oxo-bridged with the central metal M2 in a metal phthalocyanine including M2 as central metal thereof. M1 means a metal atom which is able to have a valence of up to three and, for example, involves a metal atom of the 3A group (such as Sc and Y) or the 3B group (such as Al, Ga, In and Tl) on the periodic table. M2 means a metal atom which is able to have a valence of four and, for example, involves a metal atom of the 4A to 7A groups, the 8 group and the 4B to 6B groups on the periodic table. A metal atom of the 3A group or the 3B group on the periodic table (such as Al and Ga) is not included in M2. Meanwhile, M2 may exist as a trivalent form when it is included in the structure of the μ-oxo bridged heterometal phthalocyanine compound.

The μ-oxo bridged heterometal phthalocyanine compound of the present invention may have one or more substituent groups and/or substituent atoms (R) on the aromatic rings thereof. The kind of the substituent groups and the substituent atoms is not particularly limited as long as it exists with stability in the compounds, and specific examples thereof include an alkyl group (such as a methyl group, an ethyl group, a propyl group, an isopropyl group, a butyl group, a tert-butyl group and an isoamyl group), an alkoxy group (such as a methoxy group, an ethoxy group, an isopropoxy group and a butoxy group), a phenoxy group, an aryl group (such as a phenyl group and a tolyl group), an aralkyl group (such as a benzyl group), an allyl group, an alkenyl group, a cyano group, a halogen atom (such as Cl, Br, I and F), a carboxylate group, a sulfonate group, a nitro group, an amino group, and the like.

In addition, the μ-oxo bridged heterometal phthalocyanine compound of the present invention may carry positive charge (n+) corresponding to a valence of central metal atom (M2) and, therefore, typically exists in a form of being accompanied by a suitable counteranion (A) in a solution. Examples of the counteranion (A) include a monovalent inorganic anion such as hydroxy ion (OH$^-$), halogen ion (for example, Cl$^-$) and hydrogen sulfate ion (HSO$_3^-$), or a divalent inorganic anion such as sulfate ion. A preferable counteranion (A) is a hydroxy ion (OH$^-$) as in the case of washing with aqueous ammonia after reacting.

The μ-oxo bridged heterometal phthalocyanine compound is produced by reacting phthalocyanine having halometal (III) as central metal thereof (hereinafter, referred to as halometal (III) phthalocyanine) with phthalocyanine having oxymetal (IV) as central metal thereof (hereinafter, referred to as oxymetal (IV) phthalocyanine).

Halometal (III) phthalocyanine is represented, for example, by the following formula A:

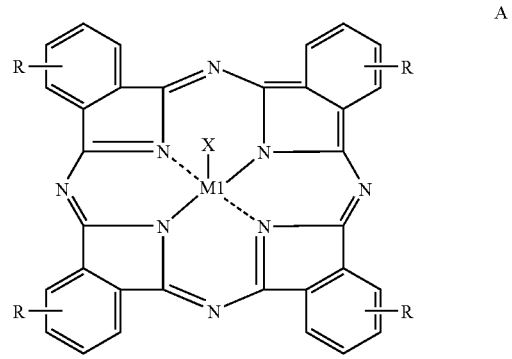

wherein R and M1 have the same meanings as defined above, and X represents a halogen atom.

Halometal (III) phthalocyanine can be obtained by using a well-known method. The method includes, for example, reacting phthalonitrile, 1,3-diimino isoindoline or derivatives thereof with a halide of trivalent metal atom in an organic solvent with high-boiling point such as 1-chloronaphtalene or quinoline. In addition, the product may optionally be filtered under heating and washed with hot DMF, DMF and the like. A halogen atom of the halide includes fluorine, chlorine, bromine or iodine, chlorine being preferred.

Preferable examples of central metal atom M1 of the halometal (III) phthalocyanine include aluminum Al (III) and gallium Ga (III). Indium In (III), however, is not preferred as M1. In case of a halometal (III) phthalocyanine having a central metal of Indium, Indium is easily eliminated from a phthalocyanine ring to produce a metal-free phthalocyanine as a side reaction. This side reaction would make the occurrence of the reaction of the present invention difficult.

Examples of halometal (III) phthalocyanine preferably include chlorogallium phthalocyanine and chloroaluminum phthalocyanine.

Oxymetal (IV) phthalocyanine is represented, for example, by the following formula B:

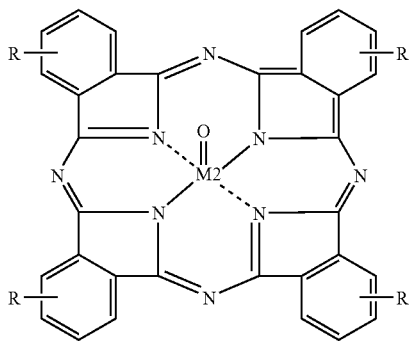

wherein R and M2 have the same meanings as defined above.

Oxymetal (IV) phthalocyanine can be obtained by using a well-known method. The method includes, for example, reacting phthalonitrile, 1,3-diimino isoindoline or a derivative thereof together with a halide of metal atom having a valence of three to six (such as titanium chloride, vanadyl chloride and molybdenum chloride) in an organic solvent with high-boiling point such as 1-chloronaphthalene or quinoline and, to hydrolyze the obtained metal (di)halide phthalocyanine. The hydrolysis may start by washing with DMF and the like, but the reaction is preferably conducted in dilute hydrochloric acid as required.

Examples of central metal atom M2 of the oxymetal (IV) phthalocyanine include titanium Ti, vanadium V, molybdenum Mo, palladium Pd and the like. Preferable oxymetal (IV) phthalocyanine is titanyl phthalocyanine O=TiPc, vanadyl phthalocyanine O=VPc, oxymolybdenum phthalocyanine O=MoPc. Preferable oxymetal (IV) phthalocyanine includes titanyl phthalocyanine O=TiPc, vanadyl phthalocyanine O=VPc, and oxymolybdenum phthalocyanine O=MoPc. In particular, titanyl phthalocyanine is preferable.

For example, titanyl phthalocyanine can be generally obtained by reacting phthalonitrile or 1,3-diiminoisoindoline with titanium chloride (such as titanium tetrachloride) in an organic solvent with high-boiling point such as 1-chloronaphthalene or quinoline and, then, hydrolyzing the obtained chlorotitanium phthalocyanine. Alternatively, the titanyl phthalocyanine can be generally obtained by heat-refluxing phthalonitrile and titanium tetrachloride in an alcohol solvent in the presence of a proton-accepting reaction accelerator (such as 1,8-diazabicyclo [5,4,0]unde-7-cene (DBU) or 1,5-diazabicyclo [4,3,0]-5-nonene (DBN)), and hydrolyzing the obtained dichlorotitanium phthalocyanine in dilute hydrochloric acid. (Japanese Patent Kokai Publication No. H3(1991) 21669).

The μ-oxo bridged heterometal phthalocyanine compound of the present invention can be produced by reacting the halometal (III) phthalocyanine with oxymetal (IV) phthalocyanine. Halometal (III) phthalocyanine and oxymetal (IV) phthalocyanine are preferably reacted in a molar ratio of 1 to 1, namely, equimolar ratio, which produces the objective μ-oxo bridged heterometal phthalocyanine compound in high yield.

The reaction includes, for example, a method in which halometal (III) phthalocyanine is reacted with oxymetal (IV) phthalocyanine by mixing in an equimolar ratio in the presence of concentrated sulfuric acid. As the concentrated sulfuric acid, a concentration of 95% or more is preferred.

Specifically, halometal (III) phthalocyanine can be reacted with oxymetal (IV) phthalocyanine for 2 to 3 hours by dissolving in concentrated sulfuric acid under the conditions of cooling (such as a temperature of 5° C. or less). After completion of the reaction, the reacted compound can be poured onto a large quantity of water/ice to precipitate. The above operation can finely disperse and purify the resulting compound.

The treatment wherein reaction products and the like are dissolved in concentrated sulfuric acid, and then poured onto water/ice to precipitate solid material so as to be finely divided and refined, is referred to as "acid pasting treatment". In the present invention, according to the so-called acid pasting treatment, halometal (III) phthalocyanine is reacted with oxymetal (IV) phthalocyanine to obtain the μ-oxo bridged heterometal phthalocyanine compound.

After the reaction, the obtained compound is treated with aqueous ammonia to remove an acid root from the reacted compound easily. Specifically, the reacted compound is added to a mixture of water and ammonia solution and filtered, and the filtered-out compound is sufficiently washed with water and ion exchange water, followed by drying to refine the compound easily. The aqueous ammonia to be suitably used may have a concentration of 1% or more, preferably 5 to 50%, and the aqueous ammonia having a concentration of 25% is more preferably used.

This method enables the μ-oxo bridged heterometal phthalocyanine compound of the present invention to be produced simply, selectively and with high yield.

Examples of the preferable combination of halometal (III) phthalocyanine/oxymetal (IV) phthalocyanine for producing a μ-oxo bridged heterometal phthalocyanine compound of the present invention include chlorogallium phthalocyanine/titanyl phthalocyanine, chlorogallium phthalocyanine/vanadyl phthalocyanine, chloroaluminum phthalocyanine/oxymolybdenum phthalocyanine, chloroaluminum phthalocyanine/titanyl phthalocyanine, chloroaluminum phthalocyanine/oxymolybdenum phthalocyanine, chlorogallium phthalocyanine/oxypalladium phthalocyanine, and the like. Further, the halometal (III) phthalocyanine/oxymetal (IV) phthalocyanine may have one or more substituent groups and/or substituent atoms on the aromatic rings thereof.

The μ-oxo bridged heterometal phthalocyanine compound thus obtained of the present invention is useful for electric charge generating materials such as organic photoreceptors, photoconductive materials, optical recording materials, organic solar cell materials, nonlinear optical materials and the like.

ADVANTAGEOUS EFFECT OF THE INVENTION

The present invention can provide a μ-oxo bridged heterometal phthalocyanine compound without difficulty, which is a "D-σ-A type dyestuff" in which a donor dyestuff (D) is connected with an acceptor dyestuff (A) through σ-bond. In conventional method, the D-σ-A type dyestuff is obtained by separating and refining from a mixture, because of difficulty of selective production. The μ-oxo bridged heterometal phthalocyanine compound is useful for electric charge generating materials such as organic photoreceptors, photoconductive materials, optical recording materials, organic solar cell materials, nonlinear optical materials and the like. In addition, the present invention can provide a method for preparing a μ-oxo bridged heterometal phthalocyanine compound, which comprises reacting halometal (III) phthalocyanine with oxymetal (IV) phthalocyanine and allows a preparation of the compound with simple, selective and high yield. The μ-oxo bridged heterometal phthalocyanine compound is able to univocally induce the polarization of intramolecular electronic state.

EXAMPLES

The following Examples further illustrate the present invention in detail but are not to be construed to limit the scope thereof.

Synthesis Example 1

Synthesis of titanyl phthalocyanine (A Method Described in Example 1 of Japanese Patent Kokai Publication No. H3(1991) 21669

1,8-Diazabicyclo[5,4,0]unde-7-cene (DBU) (91.8 g, approximately 0.6 mol) was dropped into a mixture of 76.2 g (approximately 0.6 mol) of phthalonitrile, 56.4 g (approximately 0.3 mol) of titanium tetrachloride and 200 ml of n-amyl alcohol under heat-reflux for approximately 1 hour, and then stirred under heat-reflux for 6 hours. After the reaction was completed, the mixture was allowed to cool to a temperature of 100° C., and approximately 30 ml of water was added thereto, stirred for a while. Thereafter the product was filtered, sprinkled and washed with 100 ml of dimethylformamide (DMF) and subsequently 100 ml of methanol. The obtained dichlorotitanium phthalocyanine was dispersed into 1000 ml of 3%-hydrochloric acid and washed with water until pH reached to 6 or more. The resultant water-wet cake was then put into approximately 500 ml of DMF which had been heated to a temperature of 100 to 120° C., stirred at the temperature for approximately 1 hour, and thereafter filtered under heating. The obtained DMF-wet cake was washed with 100 ml of methanol, and dried to obtain 29.1 g of titanyl phthalocyanine O=TiPc.

Synthesis Example 2

Synthesis of vanadyl phthalocyanine (A Method Described in Synthesis Example 1 of Japanese Patent Kokai Publication No. H7(1995) 247442)

Phthalonitrile (32.5 g) and 10.0 g of vanadium trichloride were reacted in 125 g of quinoline for 5 or 6 hours at 235° C. The obtained product was filtered out and washed with 200 ml of dimethylformamide (DMF), and optionally hydrolyzed with dilute hydrochloric acid, to obtain 19.0 g of vanadyl phthalocyanine O=VPc.

Synthesis Example 3

Synthesis of oxymolybdenum phthalocyanine (A Method Described in Example 2 of Japanese Patent Kokai Publication No. H8(1996) 60021)

Phthalonitrile (25.6 g) and 10.0 g of molybdenum trichloride were reacted in 150 ml of 1-chloronaphthalene for 5 hours. After the completion of the reaction, the obtained product was filtered under heating, and the obtained cake was sprinkled and washed with dimethylformamide. Then, the obtained product was dispersed again into 120 ml of DMF, stirred and refluxed for 5 hours, and thereafter was filtered under heating. The obtained product was washed with methanol and optionally hydrolyzed with dilute hydrochloric acid to obtain 15.5 g of oxymolybdenum phthalocyanine O=MoPc.

Synthesis Example 4

Synthesis of chlorogallium phthalocyanine (A Method Described in Synthesis Example 1 of Japanese Patent Kokai Publication No. H10(1998) 88023)

Phthalonitrile (145.5 g, (1.13 mol)), 680 ml of 1-chloronaphthalene and 50.0 g (0.284 mol) of gallium (III) chloride were charged into a four-necked flask, then the mixture was heated and stirred under reflux at 255° C. for 12 hours. Thereafter, the reflux was stopped and the mixture was allowed to cool to a temperature of approximately 130° C., and thereafter was filtered under heating, and sprinkled and washed with 2000 ml of hot dimethylformamide (100° C.-DMF) and 1000 ml of DMF. The obtained cake was dispersed again into 1500 ml of DMF, stirred and refluxed for 3 hours, and thereafter was filtered under heating at 110° C., thereafter sprinkled and washed with 1000 ml of hot DMF (110° C.) and 1000 ml of DMF. After repeating this step twice, the obtained cake was washed with 1000 ml of methanol and 1000 ml of water, thereafter dried at 70° C. to obtain 128.8 g of chlorogallium phthalocyanine ClGaPc (yield: 73.5%).

Synthesis Example 5

Synthesis of chloroaluminum phthalocyanine (A Method Described in Synthesis Example 1 of Japanese Patent Kokai Publication No. H9(1997) 217020)

Phthalonitrile (180.0 g, (1.41 mol)), 900 ml of 1-chloronaphthalene and 47.0 g (0.353 mol) of aluminum (III) chloride were charged into a four-necked flask, and heated and stirred under reflux at 240° C. for 6 hours. Thereafter, the reflux was stopped and the mixture was allowed to cool to a temperature of approximately 130° C., and thereafter was filtered under heating, sprinkled and washed with 1800 ml of hot toluene (100° C.), 80 ml of toluene and 900 ml of acetone, and substituted with 100 ml of toluene. The obtained cake was stirred and refluxed in 750 ml of toluene for 3 hours, thereafter filtered under heating at 100° C., and thereafter was washed with 1800 ml of hot toluene (100° C.), 180 ml of toluene and 900 ml of acetone, and the solvent was substituted with 400 ml of water. The obtained cake was added to 4500 ml of water and heat-dispersed at 70° C. for 1 hour. After being filtered under heating, the obtained cake was washed with 900 ml of acetone and 1000 ml of water, and dried at 70° C. to obtain 187.6 g of chloroaluminum phthalocyanine ClAlPc (yield: 92.5%).

Synthesis Example 6

Chlorogallium phthalocyanine obtained in Synthesis Example 4 was dissolved in concentrated sulfuric acid and the acid pasting treatment was conducted. It is known that the product thus obtained is a mixture of hydroxygallium phthalocyanine (HOGaPc) and μ-oxo gallium phthalocyanine dimer (PcGa—O—GaPc), as described in the Journal of Chemical Society of Japan,12, 878, 1997.

Synthesis Example 7

Synthesis of tetrakis(tert-butyl)-titanylphthalocyanine

The same procedure as Synthesis Example 1 was conducted except that tert-butyl-phthalonitrile was employed instead of the starting material (phthalonitrile) in Synthesis Example 1 to synthesize tetrakis(tert-butyl)-titanylphthalocyanine O=TiPc(t-Bu)$_4$.

Synthesis Example 8

Synthesis of tetrakis(tert-butyl)-chlorogallium phthalocyanine

The same procedure as Synthesis Example 4 was conducted except that tert-butyl-phthalonitrile was employed instead of the starting material (phthalonitrile) in Synthesis Example 4 to synthesize tetrakis(tert-butyl)-chlorogallium phthalocyanine ClGaPc(t-Bu)$_4$.

Example 1

Synthesis of μ-oxo bridged heterometal phthalocyanine Compound Based on ClGaPc/OTiPc (1:1)

Concentrated sulfuric acid (358 g) was cooled to a temperature of 5° C. or less, and a mixture of 6.1 g (0.010 mol) of chlorogallium phthalocyanine and 5.7 g (0.010 mol) of titanyl phthalocyanine was added thereto with keeping the temperature, and was stirred at 5° C. for 2 hours. This mixture was dropped into 0.6 L water and 1.4 L of ice at 10° C. or less and dispersed for 2 hours. After standing for a while, the mixture was filtered under reduced pressure, and the obtained wet cake was sprinkled and washed with 2.0 L of water. The wet cake and 200 ml of water were charged into a 3 L beaker and dispersed at room temperature for 2 hours. After being filtered under reduced pressure, 2.0 L of water was sprinkled on the obtained wet cake so as to wash. The wet cake, 0.2 L of water and 0.15 L of 25%-aqueous ammonia were charged into a 1 L separable flask and dispersed at room temperature for 6 hours. After being filtered under reduced pressure, 2.0 L of hot water and 1.0 L of ion-exchanged water were sprinkled on the obtained wet cake so as to wash. The wet cake was dried at 70° C. to obtain 10.7 g of blue solid represented by the following formula (yield: 91.0%).

The results of elemental analysis of this compound (PcGa—O—TiPc, molecular weight: 1175.64) are shown in Table 1.

TABLE 1

|  | C | H | N | Ga | Ti |
|---|---|---|---|---|---|
| Calculated Value | 65.38 | 2.83 | 19.06 | 5.93 | 4.07 |
| Found Value | 66.01 | 2.49 | 18.11 | 6.00 | 3.65 |

Figure 2:
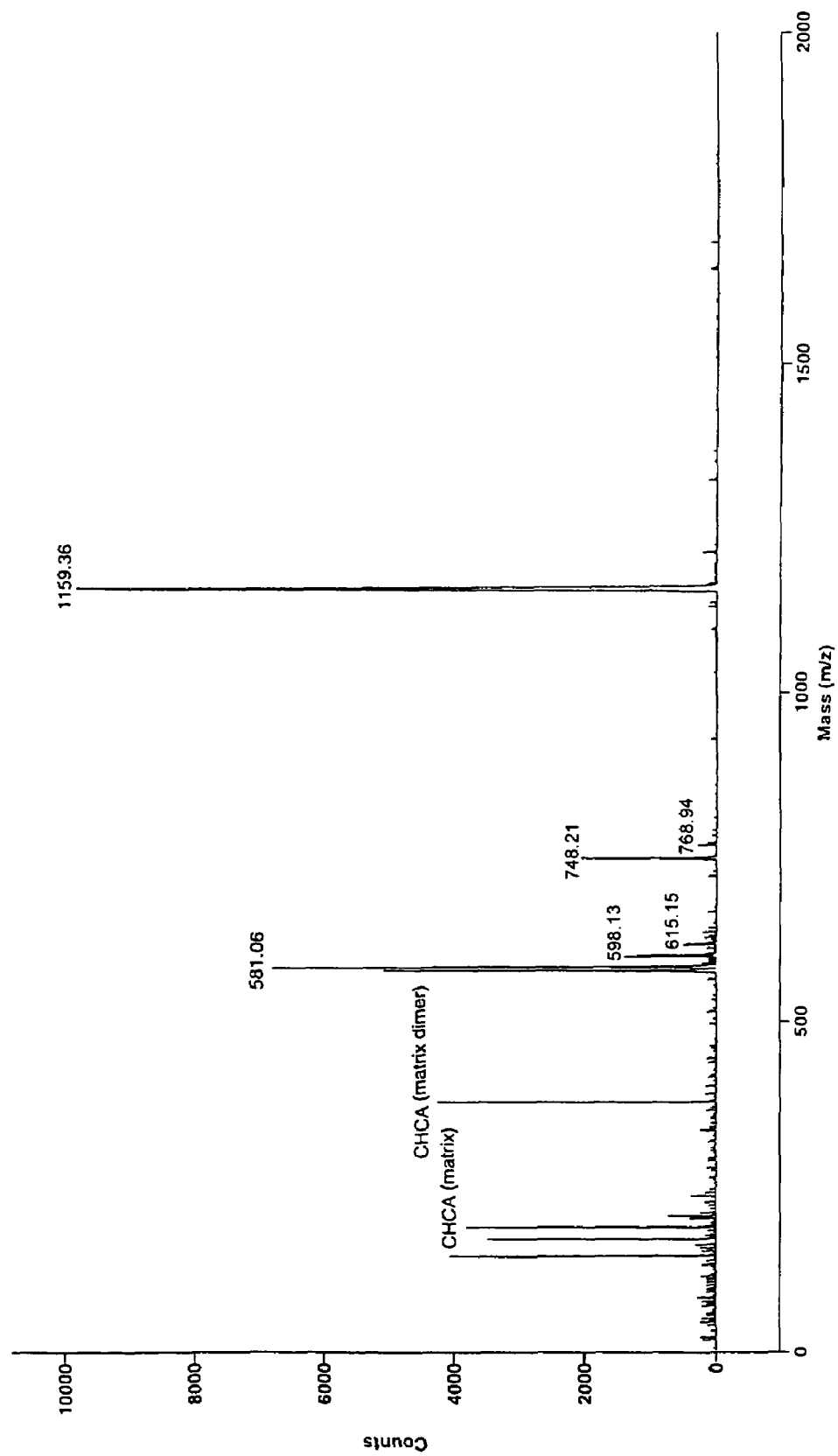
FIG. 2 is a TOF-MS spectrum of Example 1.

An X-ray diffraction spectrum (XRD spectrum) of this compound is shown in FIG. 1. In addition, a mass spectrum of this compound by TOF-MS (time-of-flight mass spectrum) is shown in FIG. 2. The mass spectrum by TOF-MS was conducted by using "KOMPACT MALDI III" under the condition of detection mode: POSITIVE, applied voltage: LOW (5 KV) and flying mode: REFLECTION.

Example 2

Synthesis of μ-oxo bridged heterometal phthalocyanine Compound Based on ClGaPc/OVPc (1:1)

Concentrated sulfuric acid (182 g) was cooled to a temperature of 5° C. or less and a mixture of 3.1 g (0.005 mol) of chlorogallium phthalocyanine and 2.9 g (0.005 mol) of vanadyl phthalocyanine was added thereto with keeping the temperature thereof, and was stirred at 5° C. for 2 hours. This mixture was dropped into 0.3 L water and 1.0 L of ice at 10° C. or less and dispersed for 2 hours. After standing for a while, the mixture was filtered under reduced pressure, and the obtained wet cake was sprinkled and washed with 2.0 L of water. The wet cake and 200 ml of water were charged into a 3 L beaker and dispersed at room temperature for 2 hours. After being filtered under reduced pressure, 2.0 L of water was sprinkled on the obtained wet cake so as to wash. The wet cake, 0.2 L of water and 0.15 L of 25%-aqueous ammonia were charged into a 1 L separable flask and dispersed at room temperature for 6 hours. After being filtered under reduced pressure, 2.0 L of hot water and 1.0 L of ion-exchanged water were sprinkled on the obtained wet cake so as to wash. The wet cake was dried at 70° C. to obtain 5.3 g of blue solid represented by the following formula (yield: 90.0%).

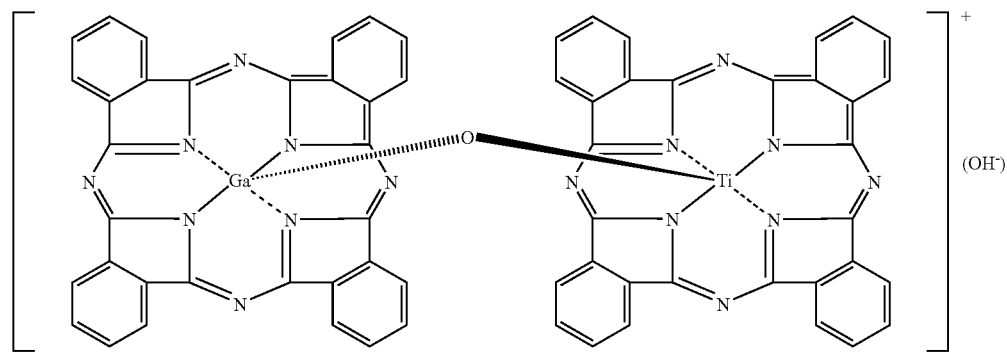

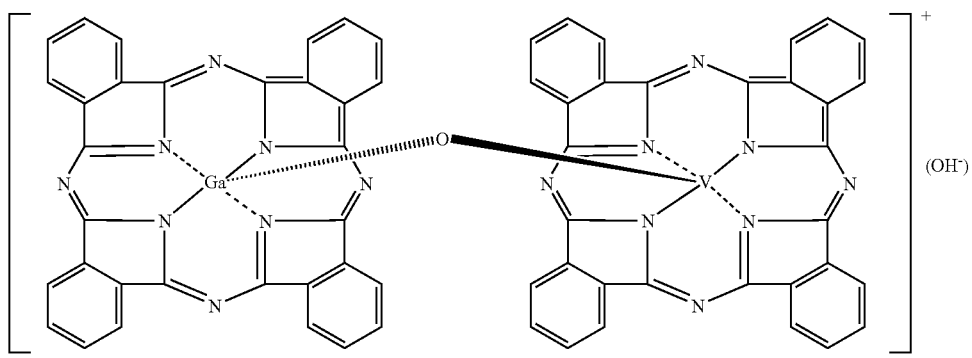

The results of elemental analysis of this compound (PcGa—O—VPc, molecular weight: 1178.72) are shown in Table 2.

TABLE 2

| | C | H | N | Ga | V |
|---|---|---|---|---|---|
| Calculated Value | 65.21 | 2.82 | 19.01 | 5.92 | 4.32 |
| Found Value | 66.71 | 2.33 | 18.71 | 5.84 | 4.36 |

Figure 3:
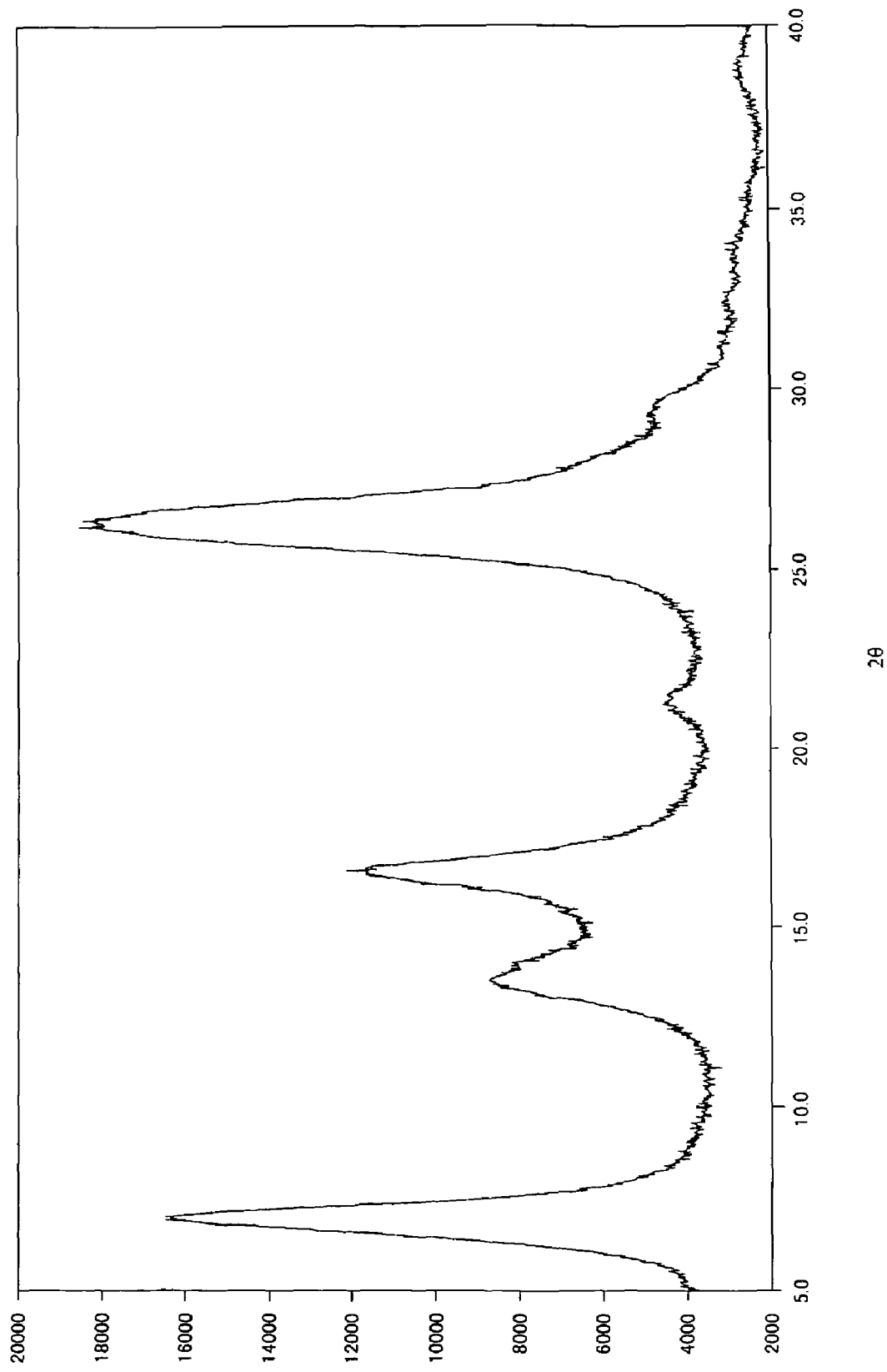
FIG. 3 is a XRD spectrum of Example 2.
Figure 4:
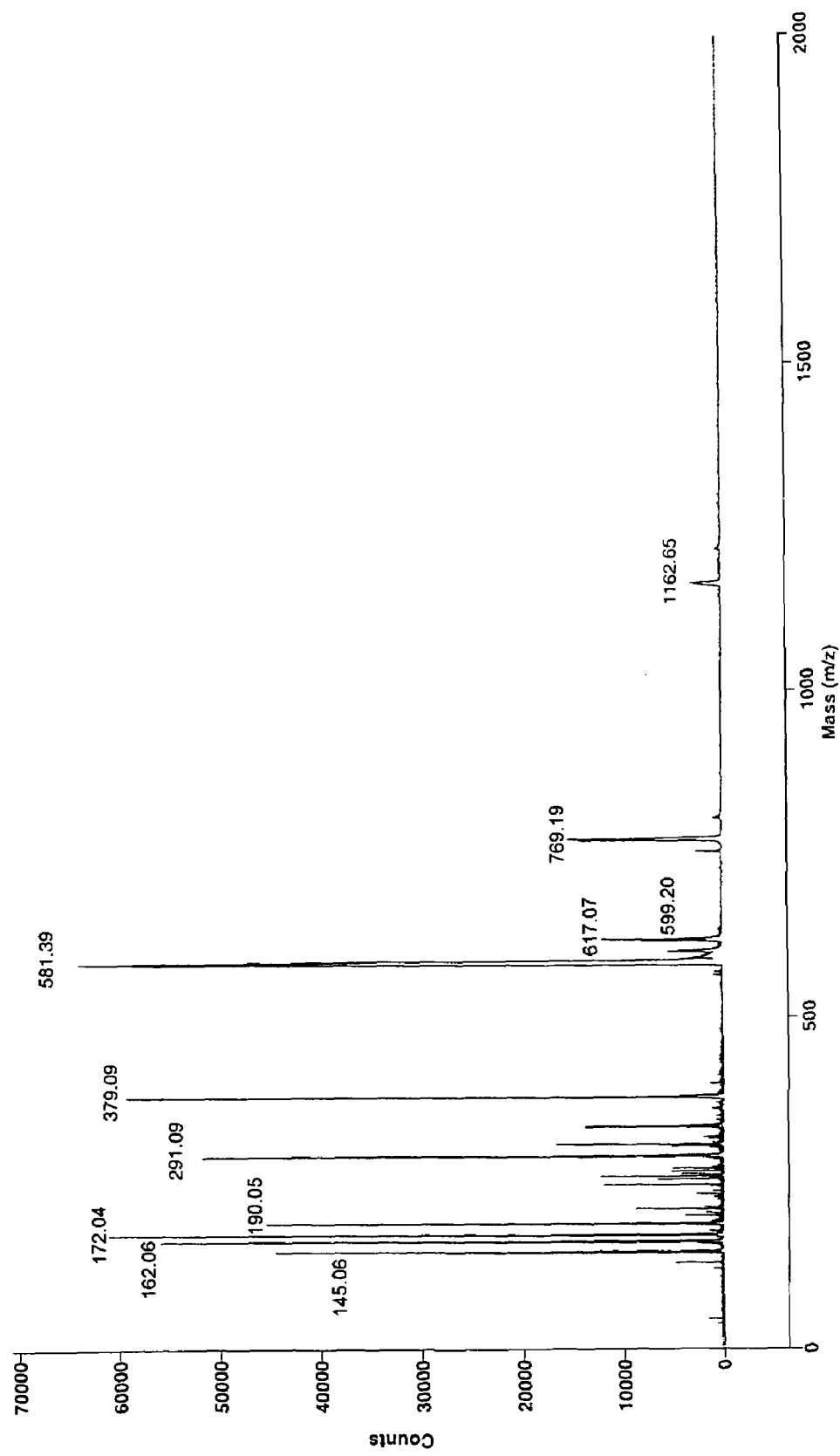
FIG. 4 is a TOF-MS spectrum of Example 2.

An XRD spectrum of this compound is shown in FIG. 3. In addition, a mass spectrum of this compound by TOF-MS is shown in FIG. 4.

Example 3

Synthesis of μ-oxo bridged heterometal phthalocyanine Compound Based on ClGaPc/OMoPc (1:1)

Concentrated sulfuric acid (190 g) was cooled to a temperature of 5° C. or less and a mixture of 3.1 g (0.005 mol) of chlorogallium phthalocyanine and 3.1 g (0.005 mol) of oxymolybdenum phthalocyanine was added thereto with keeping the temperature thereof, and was stirred at 5° C. for 2 hours. This mixture was dropped into 0.3 L water and 0.9 L of ice at 10° C. or less and dispersed for 2 hours. After standing for a while, the mixture was filtered under reduced pressure, and the obtained wet cake was sprinkled and washed with 2.0 L of water. The wet cake and 0.9 L of water were charged into a 2 L beaker and dispersed at room temperature for 2 hours. After being filtered under reduced pressure, 1.5 L of water was sprinkled on the obtained wet cake so as to wash. The wet cake, 0.3 L of water and 0.18 L of 25%-aqueous ammonia were charged into a 1 L separable flask and dispersed at room temperature for 6 hours. After being filtered under reduced pressure, 1.5 L of hot water and 1.0 L of ion-exchanged water were sprinkled on the obtained wet cake so as to wash. The wet cake (33.6 g) was dried at 70° C. to obtain 5.0 g of blue solid represented by the following formula (yield: 81.7%).

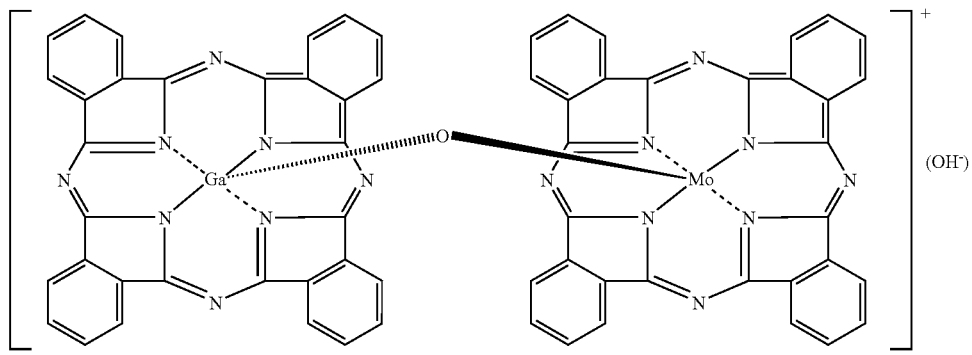

The results of elemental analysis of this compound (PcGa—O—MoPc, molecular weight: 1223.72) are shown in Table 3.

TABLE 3

| | C | H | N | Ga | Mo |
|---|---|---|---|---|---|
| Calculated Value | 62.82 | 2.72 | 18.31 | 5.70 | 7.84 |
| Found Value | 63.99 | 2.72 | 18.35 | 6.26 | 7.69 |

Example 4

Synthesis of μ-oxo bridged heterometal phthalocyanine Compound Based on ClAlPc/OTiPc (1:1)

Concentrated sulfuric acid (176 g) was cooled to a temperature of 5° C. or less and a mixture of 2.9 g (0.005 mol) of chloroaluminum phthalocyanine and 2.9 g (0.005 mol) of titanylphthalocyanine was added thereto with keeping the temperature thereof, and was stirred at 5° C. for 2 hours. The mixture was dropped into 0.4 L water and 0.8 L of ice at 10° C. or less and dispersed for 2 hours. After standing for a while, the mixture was filtered under reduced pressure, and the obtained wet cake was sprinkled and washed with 2.0 L of water. The wet cake and 0.7 L of water were charged into a 2 L beaker and dispersed at room temperature for 2 hours. After being filtered under reduced pressure, 1.5 L of water was sprinkled on the obtained wet cake so as to wash. The wet cake, 0.2 L of water and 0.15 L of 25%-aqueous ammonia were charged into a 1 L separable flask and dispersed at room temperature for 6 hours. After being filtered under reduced pressure, 1.5 L of hot water and 1.5 L of ion-exchanged water were sprinkled on the obtained wet cake so as to wash. The wet cake (30.4 g) was dried at 70° C. to obtain 4.8 g of blue solid represented by the following formula (yield: 84.8%).

Figure 5:
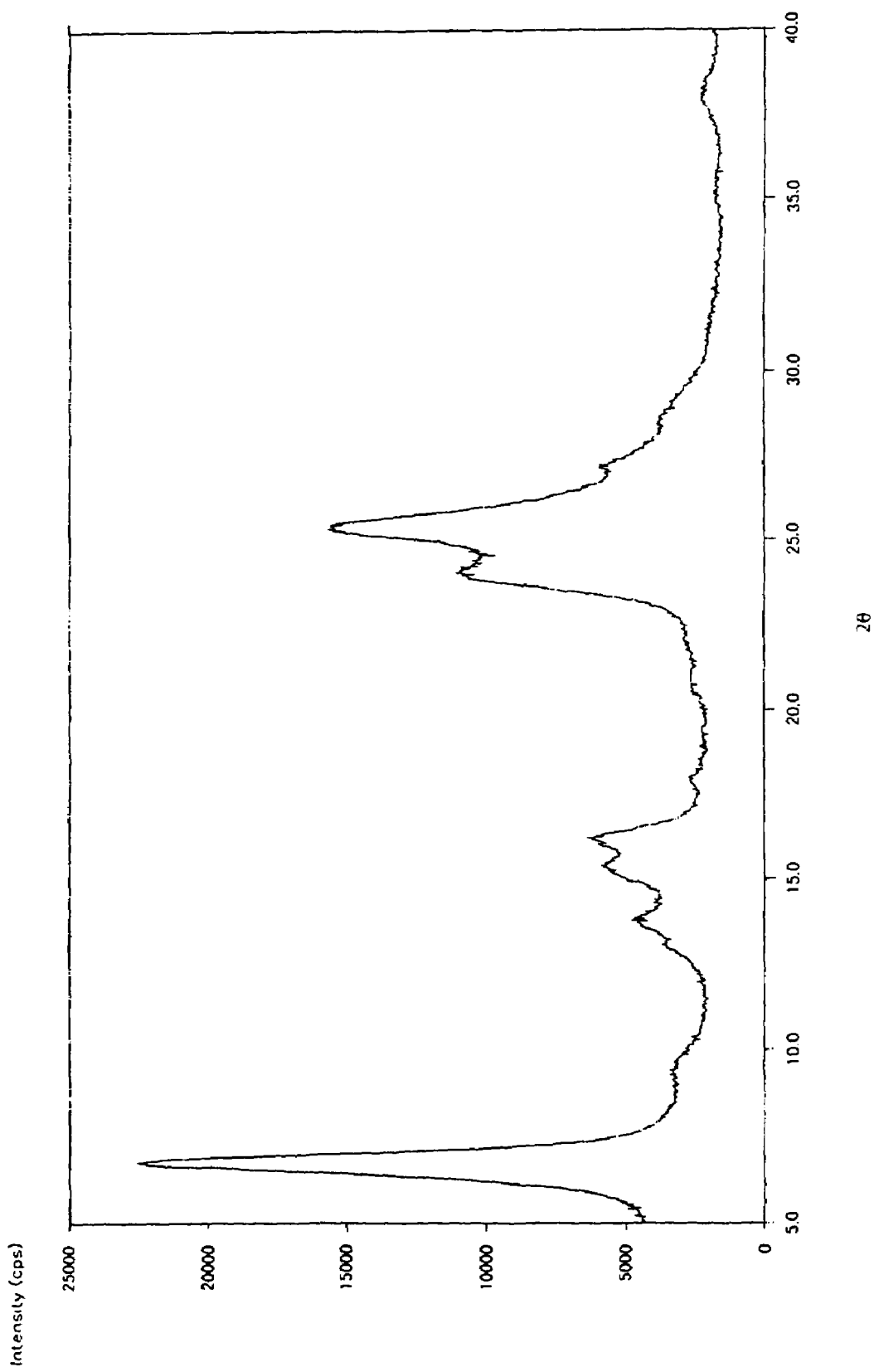
FIG. 5 is a XRD spectrum of Example 4.
Figure 6:
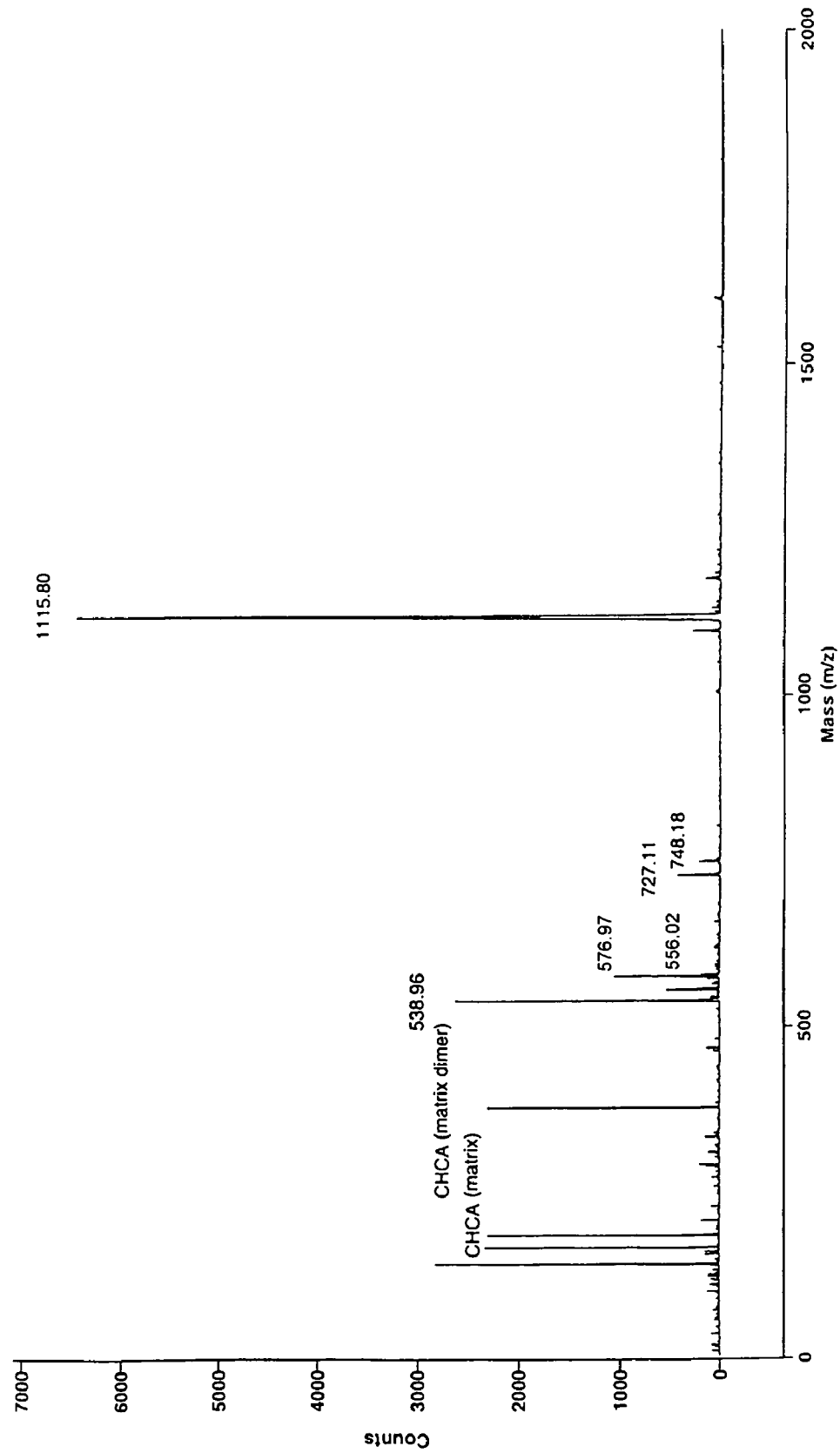
FIG. 6 is a TOF-MS spectrum of Example 4.

An XRD spectrum of this compound is shown in FIG. 5. In addition, a mass spectrum of this compound by TOF-MS is shown in FIG. 6.

Example 5

Synthesis of μ-oxo bridged heterometal phthalocyanine Compound Based on ClAlPc/OVPc (1:1)

Concentrated sulfuric acid (352 g) was cooled to a temperature of 5° C. or less and a mixture of 5.8 g (0.010 mol) of chloroaluminum phthalocyanine and 5.8 g (0.010 mol) of vanadyl phthalocyanine was added thereto with keeping the temperature thereof, and was stirred at 5° C. for 2 hours. This mixture was dropped into 0.5 L water and 1.5 L of ice at 10° C. or less and dispersed for 2 hours. After standing for a while, the mixture was filtered under reduced pressure, and the

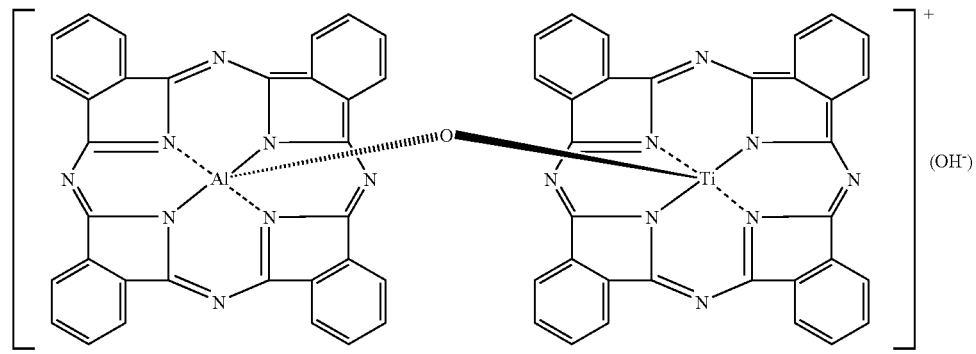

The results of elemental analysis of this compound (PcAl—O—TiPc, molecular weight: 1132.90) are shown in Table 4.

TABLE 4

|  | C | H | N | Al | Ti |
| --- | --- | --- | --- | --- | --- |
| Calculated Value | 67.85 | 2.94 | 19.78 | 2.38 | 4.23 |
| Found Value | 66.17 | 2.39 | 18.35 | 2.24 | 4.90 | obtained wet cake was sprinkled and washed with 1.0 L of water. The wet cake and 1.4 L of water were charged into a 3 L beaker and dispersed at room temperature for 2 hours. The wet cake, 0.4 L of water and 0.2 L of 25%-aqueous ammonia were charged into a 1 L separable flask and dispersed at room temperature for 6 hours. After being filtered under reduced pressure, 1.5 L of hot water and 1.5 L of ion-exchanged water were sprinkled on the obtained wet cake so as to wash. The wet cake was dried at 70° C. to obtain 10.2 g of blue solid represented by the following formula (yield: 89.8%).

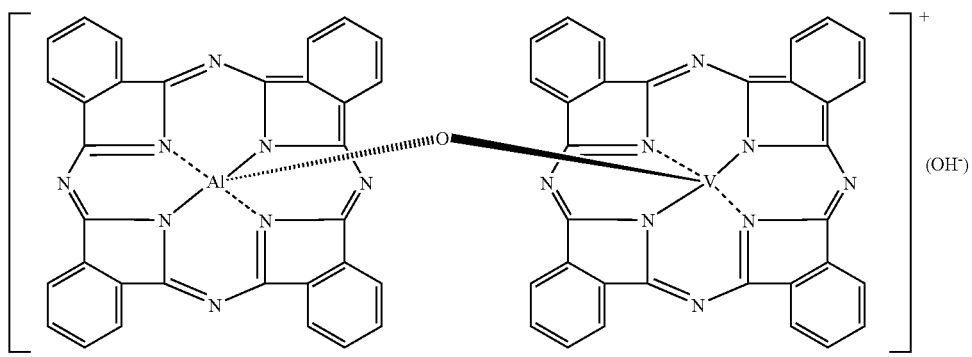

The results of elemental analysis of this compound (PcAl—O—VPc, molecular weight: 1135.98) are shown in Table 5.

TABLE 5

|  | C | H | N | Al | V |
|---|---|---|---|---|---|
| Calculated Value | 67.67 | 2.93 | 19.73 | 2.38 | 4.48 |
| Found Value | 69.43 | 2.49 | 19.14 | 2.20 | 4.58 |

Example 6

Synthesis of μ-oxo bridged heterometal phthalocyanine Compound Based on ClGaPc/(tert-Bu)$_4$PcTi=O (1:1)

Concentrated sulfuric acid (74 g) was cooled to a temperature of 5° C. or less and a mixture of 1.16 g (1.87 mmol) of chlorogallium phthalocyanine and 1.50 g (1.87 mmol) of (tetra-tert-butyl)titanylphthalocyanine was added thereto with keeping the temperature thereof, and was stirred at 5° C. for 2 hours. This mixture was dropped into 0.15 L water and 0.3 L of ice at 10° C. or less and dispersed for 2 hours. After standing for a while, the mixture was filtered under reduced pressure, and the obtained wet cake was sprinkled and washed with 0.5 L of water. The wet cake and 0.65 L of water were charged into a 1 L beaker and dispersed at room temperature for 2 hours. The wet cake, 0.4 L of water and 0.1 L of 25%-aqueous ammonia were charged into a 1 L separable flask and dispersed at room temperature for 6 hours. After being filtered under reduced pressure, 0.5 L of hot water and 1.0 L of ion-exchanged water were sprinkled on the obtained wet cake so as to wash. The wet cake was dried at 70° C. to obtain 1.84 g of blue solid represented by the following formula (yield: 70.2%).

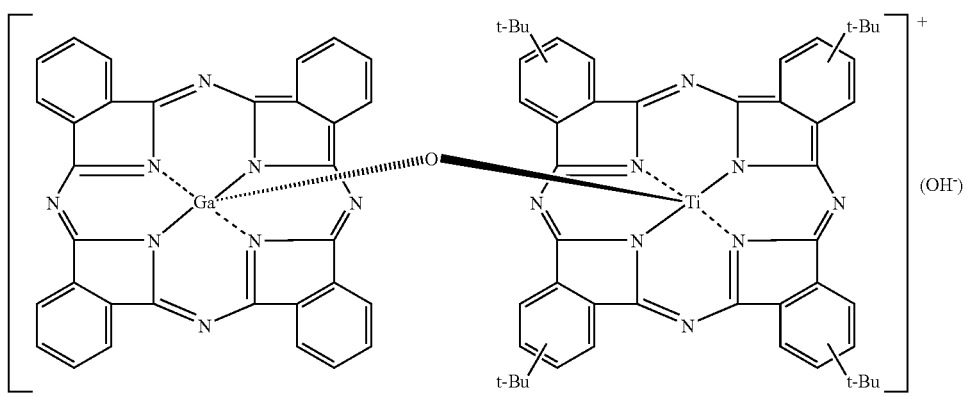

The results of elemental analysis of this compound (PcGa—O—TiPc(tert-Bu)$_4$, molecular weight: 1400.07) are shown in Table 6.

TABLE 6

|  | C | H | N | Ga | Ti |
|---|---|---|---|---|---|
| Calculated Value | 68.63 | 4.68 | 16.01 | 4.98 | 3.42 |
| Found Value | 69.05 | 4.10 | 15.32 | 5.16 | 2.76 |

Figure 7:
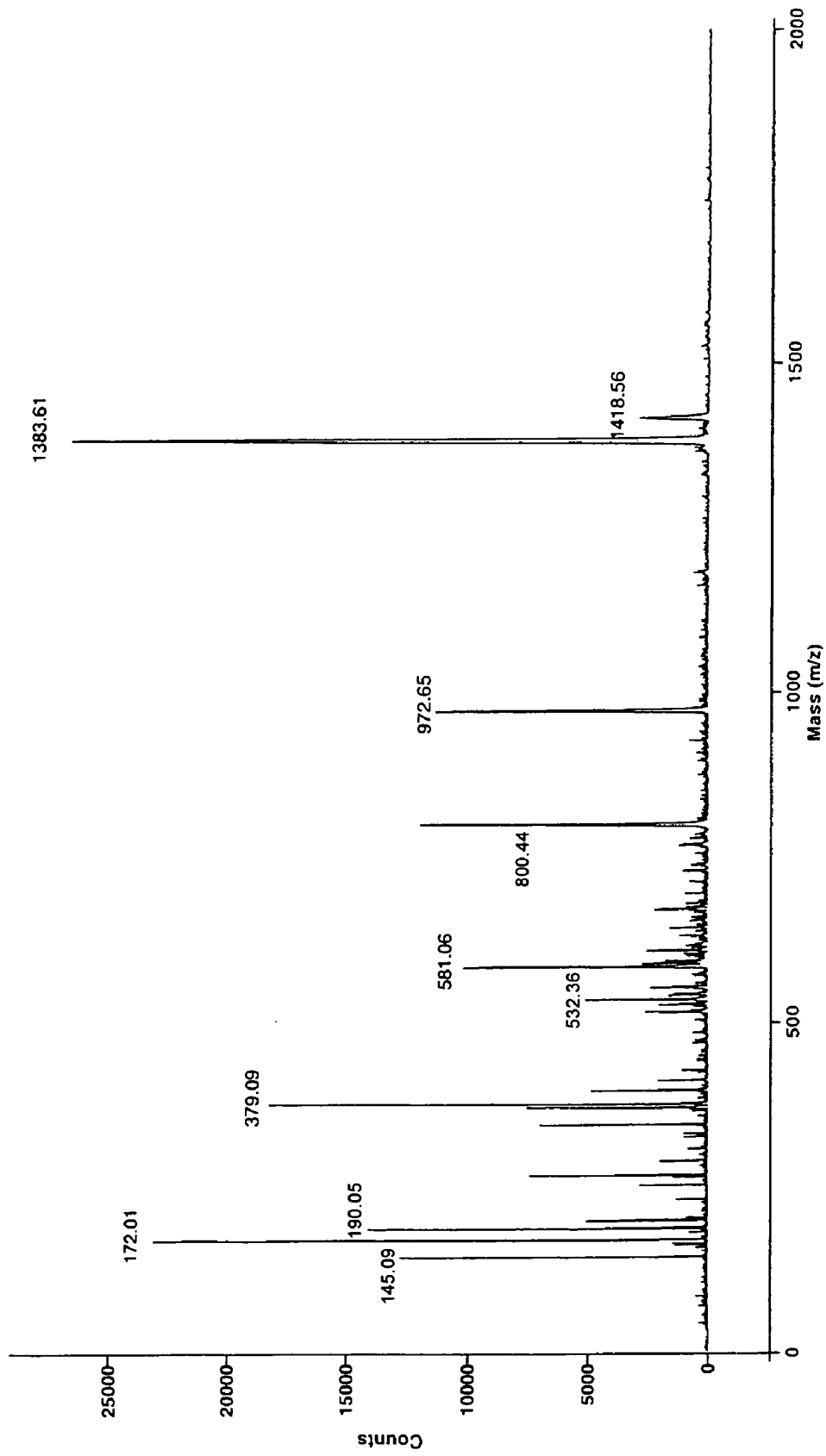
FIG. 7 is a TOF-MS spectrum of Example 6.

In addition, a mass spectrum of this compound by TOF-MS is shown in FIG. 7.

Example 7

Synthesis of μ-oxo bridged herometal phthalocyanine Compound Based on (tert-Bu)$_4$PcGaCl/(tert-Bu)$_4$PcTi=O (1:1)

Concentrated sulfuric acid (71 g) was cooled to a temperature of 5° C. or less and a mixture of 1.26 g (1.50 mmol) of (tetra-tert-butyl) chlorogallium phthalocyanine and 1.20 g (1.50 mmol) of (tetra-tert-butyl) titanylphthalocyanine was added thereto with keeping the temperature thereof, and was stirred at 5° C. for 2 hours. This mixture was dropped into 0.2 L water and 0.3 L of ice at 10° C. or less and dispersed for 2 hours. After standing for a while, the mixture was filtered under reduced pressure, and the obtained wet cake was sprinkled and washed with 1.8 L of water. The wet cake and 0.4 L of water were charged into a 1 L beaker and dispersed at room temperature for 2 hours. The wet cake, 0.2 L of water and 0.12 L of 25%-aqueous ammonia were charged into a 1 L separable flask and dispersed at room temperature for 6 hours. After being filtered under reduced pressure, 1.0 L of hot water and 1.2 L of ion-exchanged water were sprinkled on the obtained wet cake so as to wash. The wet cake was dried at 70° C. to obtain 1.89 g of blue solid represented by the following formula (yield: 77.5%).

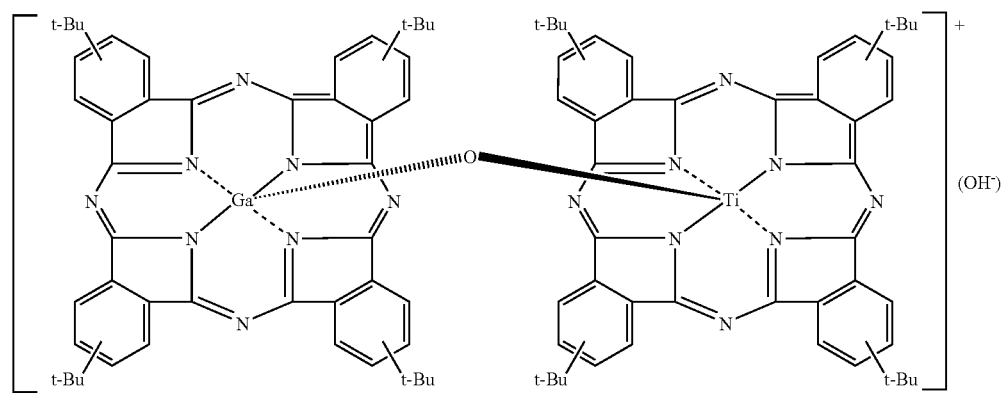

The results of elemental analysis of this compound (molecular weight: 1624.5) are shown in Table 7.

TABLE 7

|  | C | H | N | Ga | Ti |
|---|---|---|---|---|---|
| Calculated Value | 70.98 | 6.02 | 13.80 | 4.29 | 2.95 |
| Found Value | 72.35 | 5.82 | 14.04 | 3.65 | 3.14 |

Figure 8:
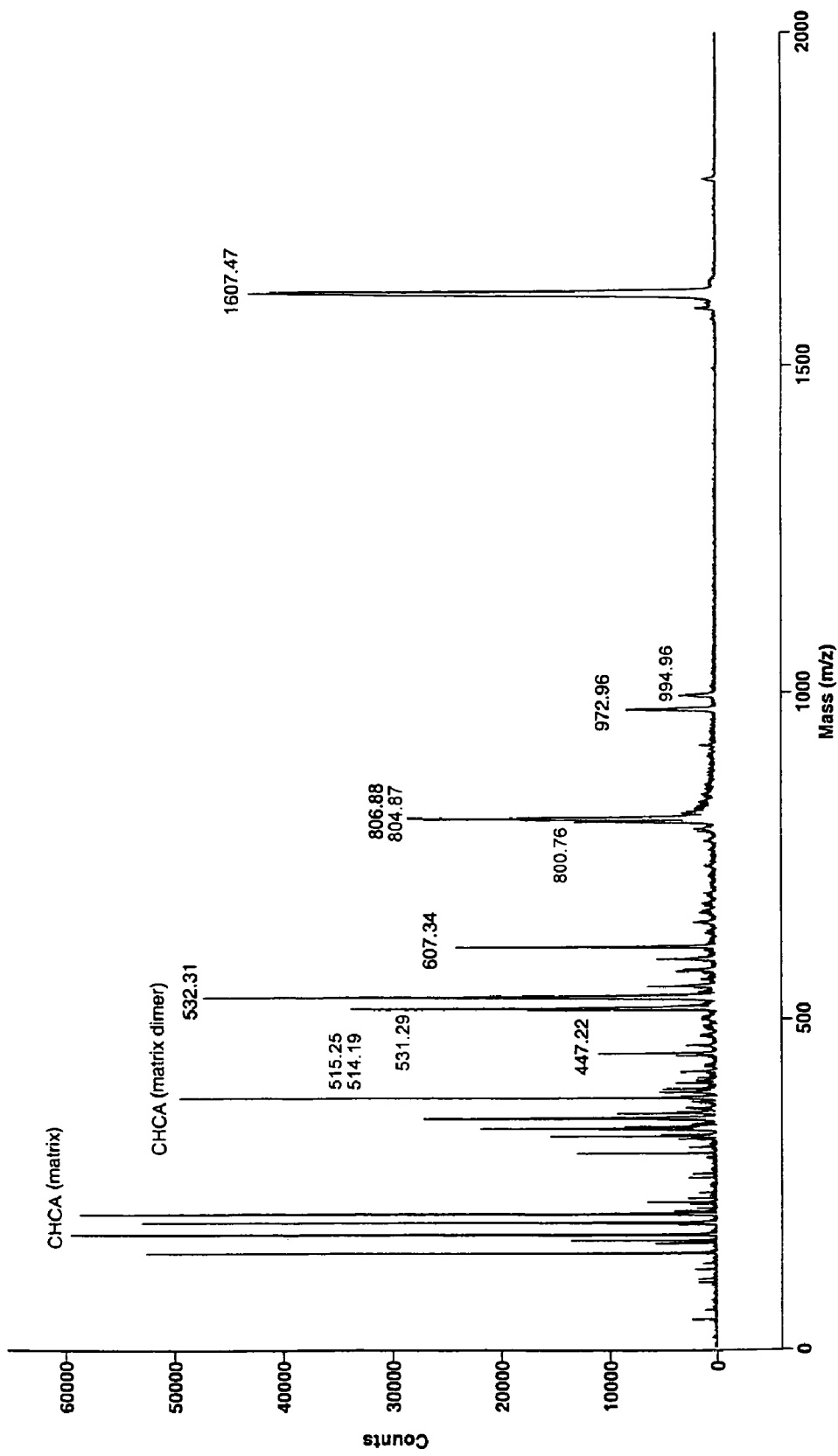
FIG. 8 is a TOF-MS spectrum of Example 7.
Figure 9:
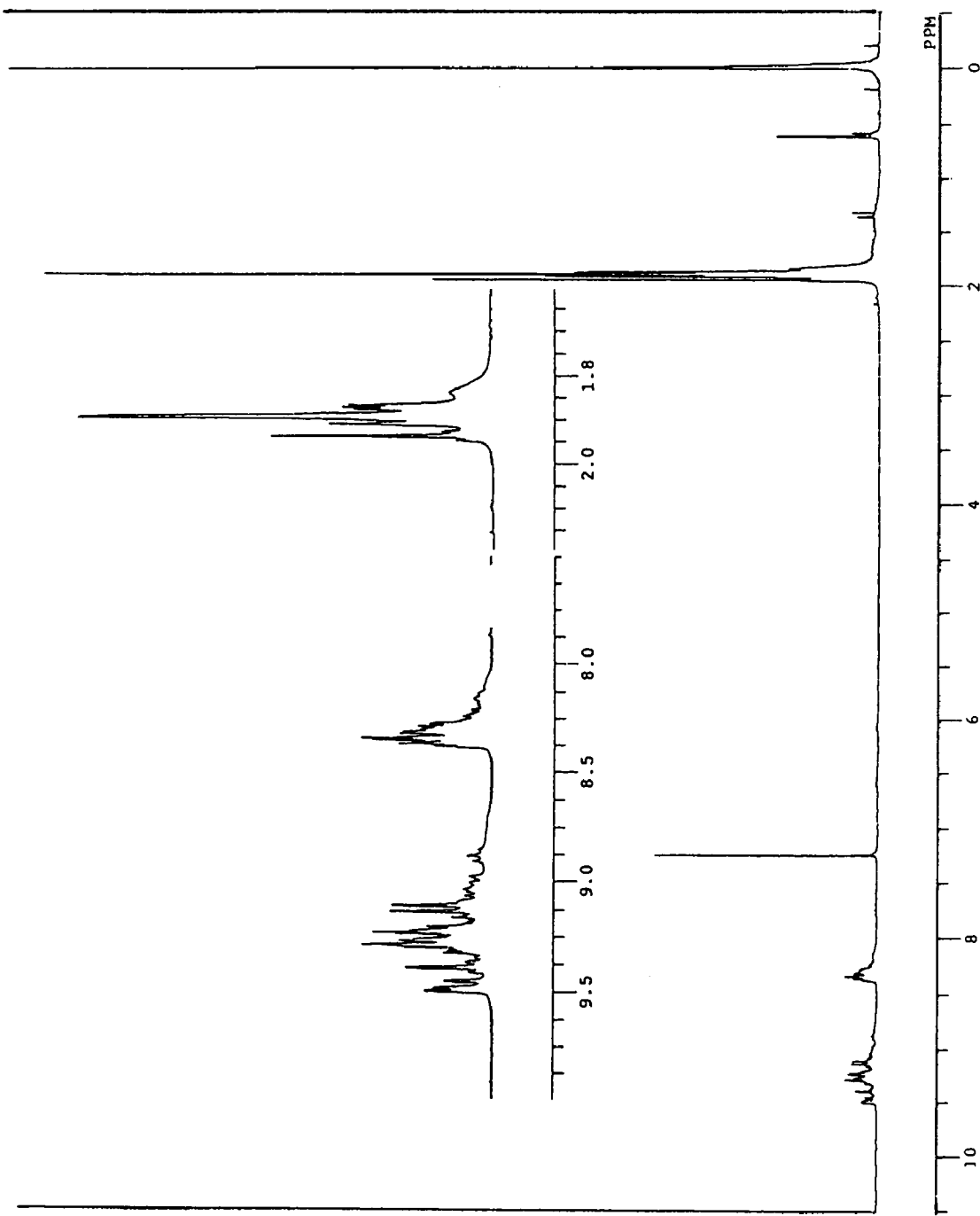
FIG. 9 is a $^1$H-HNR spectrum of Example 7.
Figure 10:
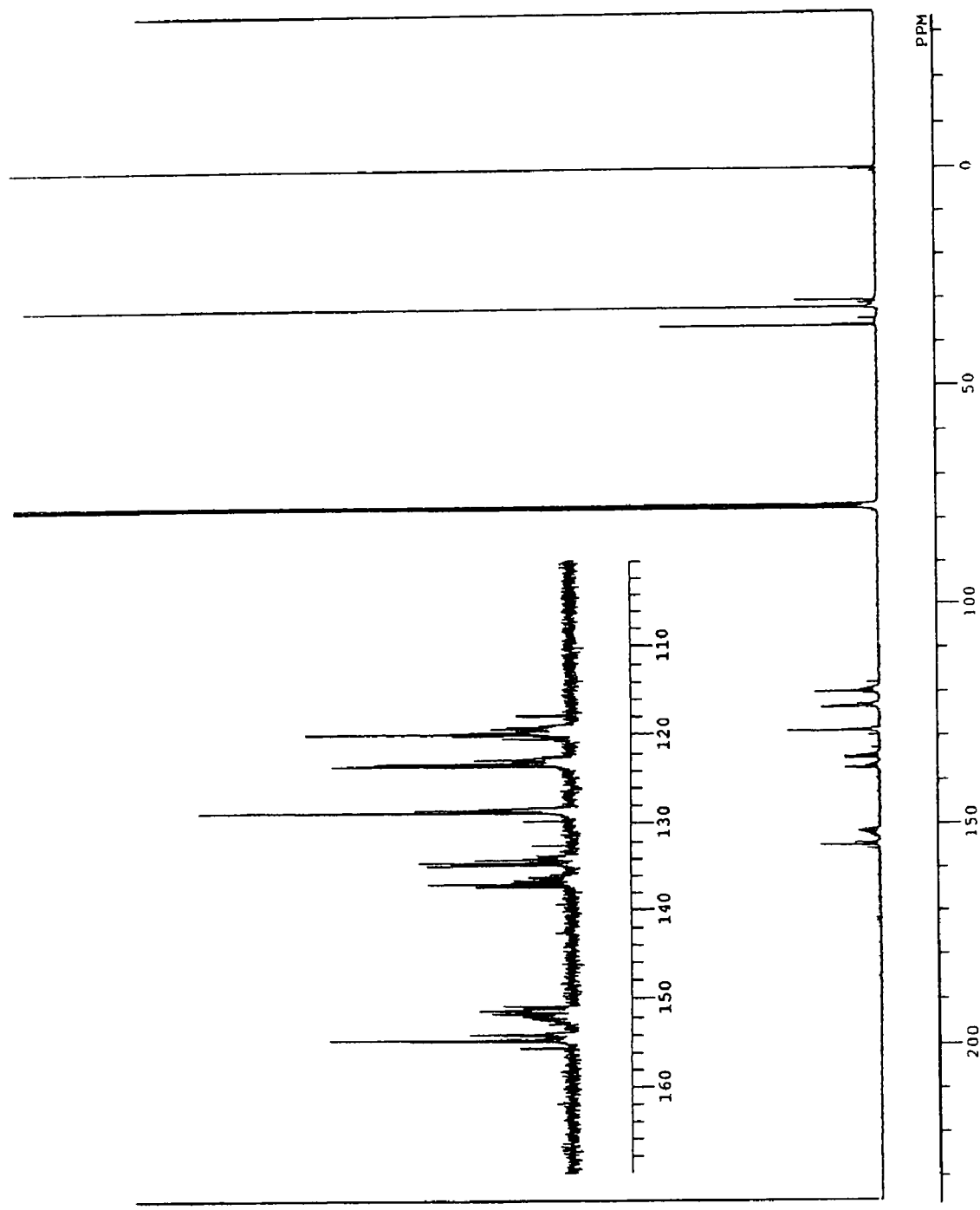
FIG. 10 is a $^{13}$C-NMR spectrum of Example 7.
Figure 11:
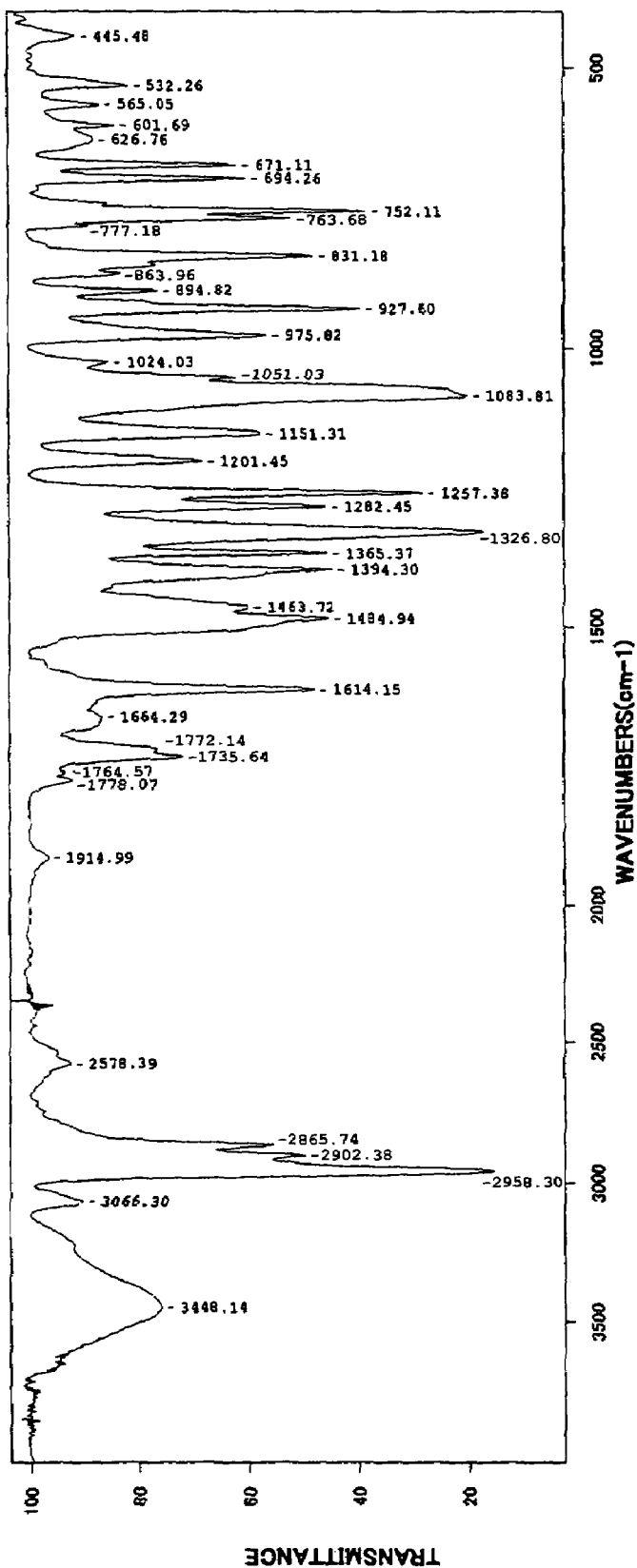
FIG. 11 is an IR spectrum of Comparative Example 7.
Figure 12:
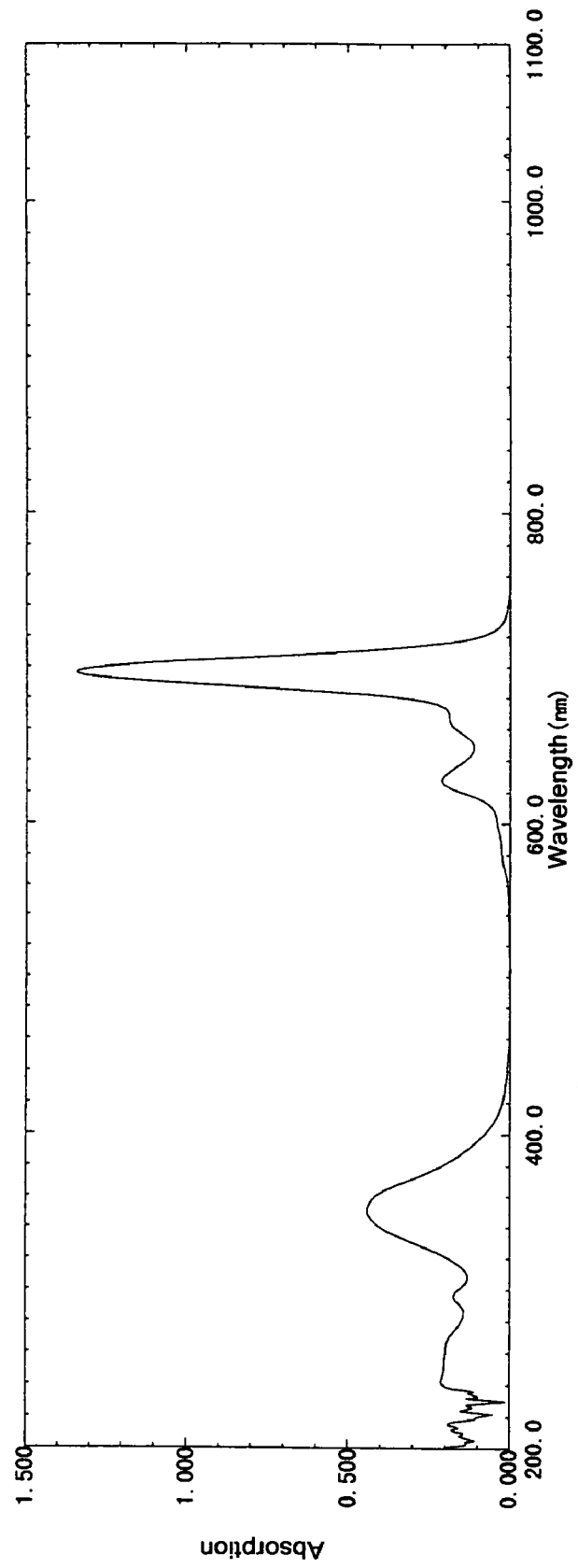
FIG. 12 is a near-ultraviolet visible near-infrared absorption of Example 7.

A mass spectrum of this compound by TOE-MS is shown in FIG. 8. In addition, a $^1$H-HNR spectrum, a $^{13}$C-NMR spectrum, an IR spectrum, a near-ultraviolet visible near-infrared absorption of this compound are shown in FIGS. 9, 10, 11 and 12, respectively.

Comparative Example 1

Synthesis of μ-oxo aluminum/gallium phthalocyanine dimer (A Method Described in Example 1 of Japanese Patent Kokai Publication No. 2000-219817)

Concentrated sulfuric acid (357 g) was cooled by ice-methanol to a temperature of 5° C. or less and a mixture of 6.17 g (0.01 mol) of chlorogallium phthalocyanine obtained in Synthesis Example 4 and 5.75 g (0.01 mol) of chloroaluminum phthalocyanine obtained in Synthesis Example 5 was added with keeping the temperature thereof, and was stirred at 5° C. or less for 2 hours. This was poured onto 1400 g of ice/600 ml of water while being stirred at 10° C. or less, and further dispersed for 1 hour after the pouring was completed. After standing for a while, the supernatant was removed and filtered. The cake was washed with 2000 ml of water, and dispersed into 1800 ml of water and suction-filtered. The cake was washed with 800 ml of water. The water-washed cake was added to 550 ml of hot water and 66 ml of 25%-aqueous ammonia and dispersed under reflux for 6 hours. After being filtered, the cake was washed with 600 ml of hot water (60° C.) and 1650 ml of ion exchange water (IEW). When pH and conductivity of the filtrate are an equal level to those of the ion exchange water, the cake was dried at 70° C. to obtain 10.5 g of blue solid (yield: 89.8%).

Then, 9.0 g of the obtained blue solid and 150 ml of o-dichlorobenzene were charged into a 300 ml flask, and the obtained mixture was stirred at 170 to 180° C. This mixture was refluxed and stirred for 10 hours with removing water to be produced. After being filtered under heating at 130° C., the obtained wet cake was sprinkled and washed sequentially with 225 ml of hot DMF (110° C.), 45 ml of DMF, 90 ml of methanol and 225 ml of IEW, thereafter the obtained cake was dried at 70° C. to obtain 8.4 g (yield: 95%) of a solid including a μ-oxo aluminum/gallium phthalocyanine dimer (PcAl—O—GaPc) in a form of mixed polymorph.

Comparative Example 2

A sample was prepared by simply mixing titanyl phthalocyanine (O=TiPc) obtained in Synthesis Example 1 with chlorogallium phthalocyanine (ClGaPc) obtained in Synthesis Example 4 in equimolar amount.

The results of elemental analysis of this simple mixture are shown in Table 8.

TABLE 8

|  | C | H | N | Ga | Ti | Cl |
|---|---|---|---|---|---|---|
| Calculated Value | 64.37 | 2.68 | 18.77 | 5.84 | 4.01 | 2.98 |
| Found Value | 63.24 | 2.59 | 18.21 | 6.26 | 3.81 | 2.91 |

Figure 13:
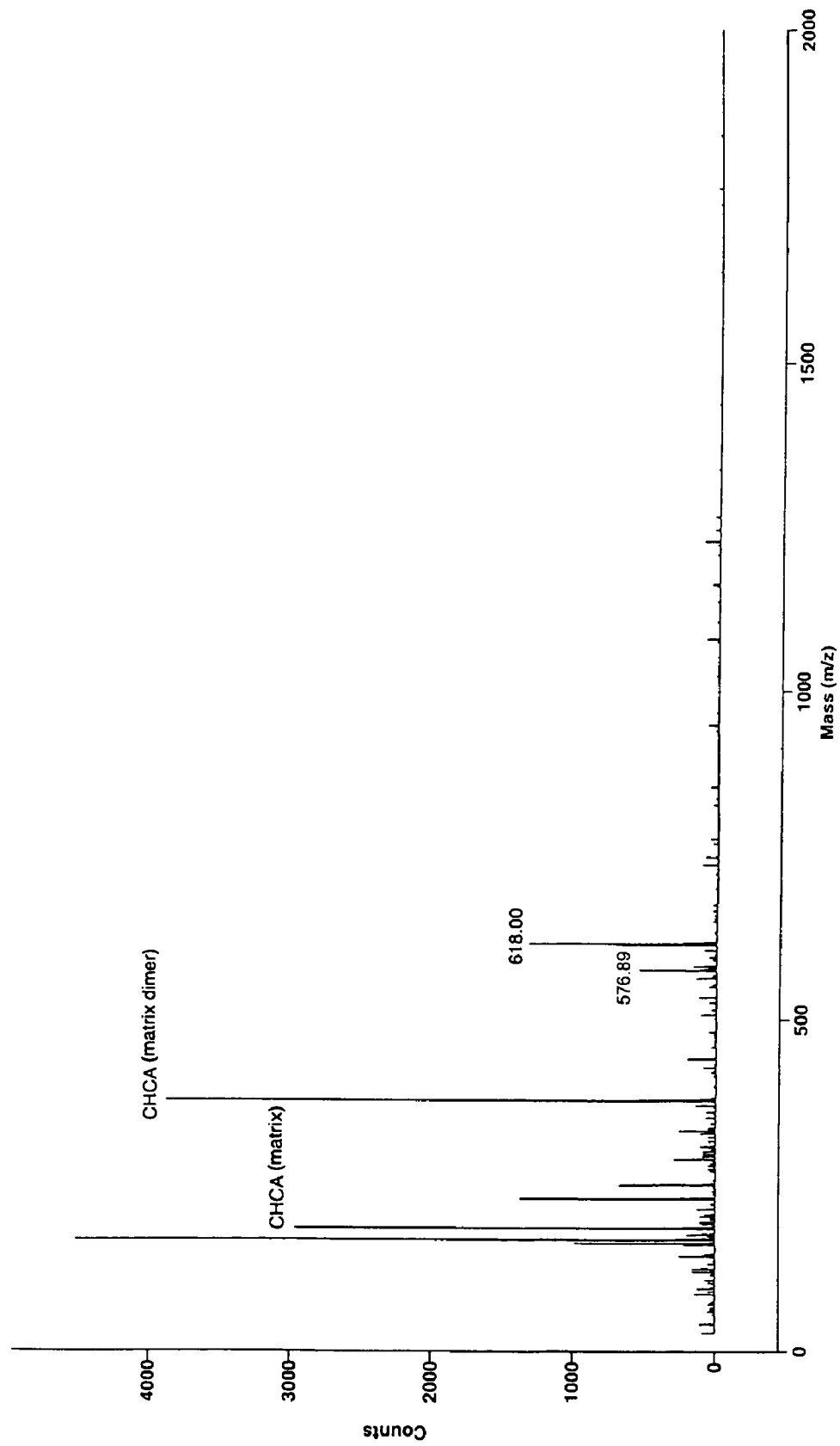
FIG. 13 is a TOF-MS spectrum of Comparative Example 2.

A mass spectrum of this simple mixture by TOF-MS is shown in FIG. 13.

Comparative Example 3

A sample was prepared by simply mixing titanyl phthalocyanine obtained in Synthesis Example 1 with a mixture of hydroxygallium phthalocyanine (HOGaPc) and μ-oxo gallium phthalocyanine dimer (PcGa—O—GaPc) obtained in Synthesis Example 6 in equimolar amount.

The results of mass spectrum by TOF-MS are shown in Tables 9 and 10, with reference to each of the ten compounds in Examples and Comparative Examples.

TABLE 9

| Example No. | X-M1Pc | O=M2Pc | Condition | TOF-MS |
|---|---|---|---|---|
| Example 1 | ClGaPc | TiOPc | Described in Example 1 | [M—OH]$^+$(1159.3) selective GaPc(l) GPL (very little) |
| Example 2 | ClGaPc | VOPc | Described in Example 2 | [M—OH]$^+$(1162.6) selective GPL (very little) |
| Example 3 | ClGaPc | MoOPc | Described in Example 3 | [M—OH]$^+$(1206.7) selective GaPc(l) GPL (very little) |
| Example 4 | ClAlPc | TiOPc | Described in Example 4 | [M—OH]$^+$(1115.8) selective AlPc(m) APL (very little) |
| Example 5 | ClAlPc | VOPc | Described in Example 5 | [M—OH]$^+$(1118.7) selective AlPc(l) APL (very little) |
| Example 6 | ClGaPc | TiOPc(t-Bu)$_4$ | Described in Example 6 | [M—OH]$^+$(1383.6) selective GaPc(l) |
| Example 7 | ClGaPc(t-Bu)$_4$ | TiOPc(t-Bu)$_4$ | Described in Example 7 | [M—OH]$^+$(1607.5) selective GaPc(l) |

TABLE 10

| Example No. | X-M1Pc | O=M2Pc | Condition | TOF-MS |
|---|---|---|---|---|
| Comparative Example 1 | ClGaPc:ClAlPc = 1:1 | — | Described in Comparative Example 1 (mixed crystal) | M$^+$(1137) GPL APL |
| Comparative Example 2 | ClGaPc | TiOPc | Described in Comparative Example 2 (simply-mixing) | M$^+$(1159.3, none) GaPc(l) |
| Comparative Example 3 | HOGaPc, containing GPL | TiOPc | Described in Comparative Example 3 (simply-mixing) | M$^+$(None) GPL/HOGaPc/GaPc(l) TiOPc (s) |

Each abbreviation in Tables 9 and 10 is as follows.
ClGaPc: chlorogallium phthalocyanine
ClAlPc: chlorogallium phthalocyanine
TiOPc: titanyl phthalocyanine
VOPc: vanadyl phthalocyanine
MoOPc: oxymolybdenum phthalocyanine
GPL: μ-oxo gallium phthalocyanine dimer
APL: μ-oxo aluminum phthalocyanine dimer
HOGaPc: hydroxygallium phthalocyanine
(l): a large peak intensity
(m): a medium peak intensity
(s): a small peak intensity
M$^+$ and [M—OH]$^+$ in Tables 9 and 10 represents the parent peak (PP) of a μ-oxo bridged heterometal phthalocyanine compound dimer in TOF-MS.

What is claimed is:

1. A μ-oxo bridged heterometal phthalocyanine compound represented by the following formula I:

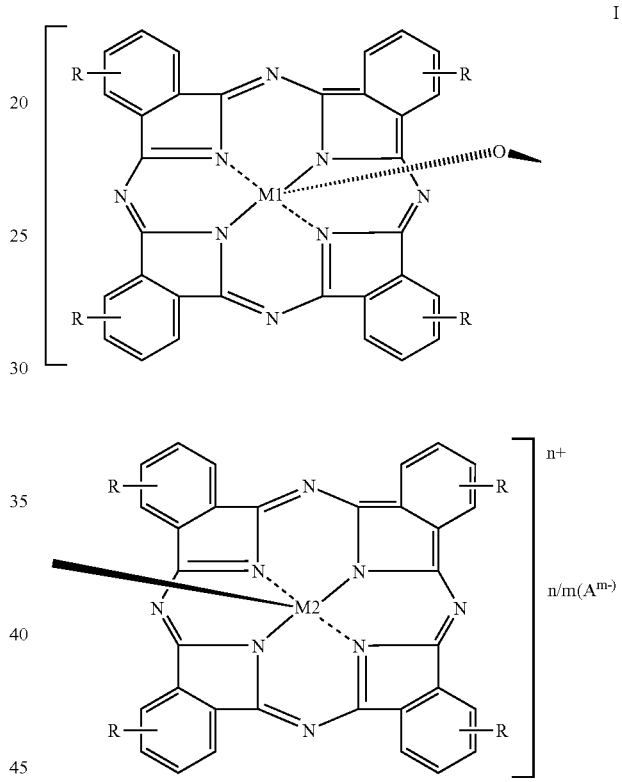

wherein M1 represents a metal atom selected from the group consisting of scandium, yttrium, aluminum, gallium and thallium, M2 represents a metal atom selected from the group consisting of titanium, vanadium and molybdenum, R represents each independently hydrogen atom or one or more substituent groups and/or substituent atoms selected from the group consisting of a hydrogen atom, a methyl group, an ethyl group, a propyl group, an isopropyl group, a butyl group, a tert-butyl group, an isoamyl group, a methoxy group, an ethoxy group, an isopropoxy group, a butoxy group, a phenoxy group, a phenyl group, a tolyl group, a benzyl group, an allyl group, an alkenyl group, a cyano group, a halogen atom of Cl, Br, I and F, a carboxylate group, a sulfonate group, a nitro group and an amino group, $(A^{m-})$ represents a counter-anion A having a valence of m, n/m represents the number of the counteranion, wherein the counteranion A is selected from the group consisting of hydroxy ion (OH$^-$), halogen ion, hydrogen sulfate ion (HSO$_3^-$) and sulfate ion, n represents an integer selected from 0 or 1 to 3 corresponding to a valence of M2, and m represents 1 or 2.

2. The μ-oxo bridged heterometal phthalocyanine compound according to claim 1, wherein the M1 is gallium or aluminum.

3. The μ-oxo bridged heterometal phthalocyanine compound according to any one of claims 1 or 2, wherein the M2 is titanium.

4. A method for preparing the μ-oxo bridged heterometal phthalocyanine compound according to claim 1, comprising the step of:

reacting a phthalocyanine having a halometal (III) as a central metal thereof with a phthalocyanine having an oxymetal(IV) as a central metal thereof in equimolar amount.

5. The method according to claim 4, wherein the phthalocyanine having a halometal (III) represents the following formula:

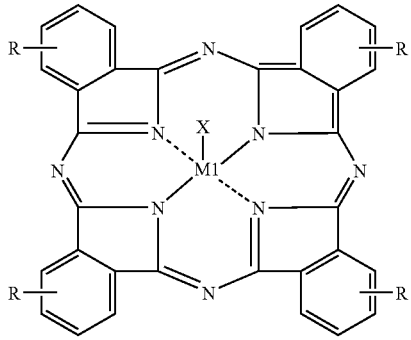

A wherein
M1 represents a metal atom selected from the group consisting of scandium, yttrium, aluminum, gallium and thallium, R represents each independently hydrogen atom or one or more substituent groups and/or substituent atoms selected from the group consisting of a hydrogen atom, a methyl group, an ethyl group, a propyl group, an isopropyl group, a butyl group, a tert-butyl group, an isoamyl group, a methoxy group, an ethoxy group, an isopropoxy group, a butoxy group, a phenoxy group, a phenyl group, a tolyl group, a benzyl group, an allyl group, an alkenyl group, a cyano group, a halogen atom of Cl, Br, I and F, a carboxylate group, a sulfonate group, a nitro group and an amino group, and X represents a halogen atom.

6. The method according to claim 4, further comprising the step of:
washing the reacted compound with aqueous ammonia.

7. The method according to claim 4, wherein the phthalocyanine having an oxymetal (IV) represents the following formula:

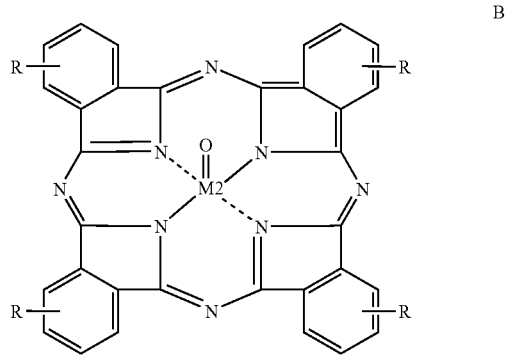

B wherein
M2 represents a metal atom selected from the group consisting of titanium, vanadium and molybdenum, and R represents each independently hydrogen atom or one or more substituent groups and/or substituent atoms selected from the group consisting of a hydrogen atom, a methyl group, an ethyl group, a propyl group, an isopropyl group, a butyl group, a tert-butyl group, an isoamyl group, a methoxy group, an ethoxy group, an isopropoxy group, a butoxy group, a phenoxy group, a phenyl group, a tolyl group, a benzyl group, an allyl group, an alkenyl group, a cyano group, a halogen atom of Cl, Br, I and F, a carboxylate group, a sulfonate group, a nitro group and an amino group.

8. The method according to claim 5, wherein the M1 is gallium or aluminum.

9. The method according to claim 7, wherein the M2 is titanium.

* * * * *